United States Patent [19]

Chen

[11] Patent Number: 4,613,942
[45] Date of Patent: Sep. 23, 1986

[54] ORIENTATION AND CONTROL SYSTEM FOR ROBOTS

[76] Inventor: Richard M. Chen, 51-25 Goldsmith St., Elmhurst, N.Y. 11373

[21] Appl. No.: 663,089

[22] Filed: Oct. 22, 1984

Related U.S. Application Data

[63] Continuation-in-part of Ser. No. 350,309, Feb. 19, 1982, abandoned.

[51] Int. Cl.[4] .......................... G06G 7/48; B25J 19/00; G06F 15/20
[52] U.S. Cl. .................................... 364/513; 364/478; 901/47; 235/375; 235/454; 235/469; 235/494; 358/101; 250/222.1; 250/568; 250/557
[58] Field of Search ............... 364/513, 468, 478, 474; 235/375, 383, 465, 454, 458, 469, 494; 358/101, 102, 106, 107; 250/221, 222.1, 566, 568, 557; 901/47

[56] References Cited

U.S. PATENT DOCUMENTS

| | | | |
|---|---|---|---|
| 3,757,942 | 9/1973 | Gunn | 235/494 |
| 3,971,917 | 7/1976 | Maddox et al. | 235/494 |
| 3,990,043 | 11/1976 | Clark | 235/494 |
| 4,056,711 | 11/1977 | Lamar | 235/494 |
| 4,254,329 | 3/1981 | Gokey et al. | 235/494 |
| 4,323,773 | 4/1982 | Carpenter | 235/375 |
| 4,374,451 | 2/1983 | Miller | 235/375 |
| 4,380,696 | 4/1983 | Masaki | 364/513 |
| 4,439,672 | 3/1984 | Salaman | 235/494 |
| 4,473,883 | 9/1984 | Yoshida et al. | 235/375 |
| 4,514,815 | 4/1985 | Anderson | 364/478 |

FOREIGN PATENT DOCUMENTS

| | | | |
|---|---|---|---|
| 2403698 | 8/1975 | Fed. Rep. of Germany | 901/47 |
| 2430058 | 1/1976 | Fed. Rep. of Germany | 901/47 |

Primary Examiner—Jerry Smith
Assistant Examiner—John R. Lastova
Attorney, Agent, or Firm—Marvin Feldman

[57] ABSTRACT

An orientation and control system for use with robots provides identification, orientation and operating instructions coded indicia on diverse parts, which indicia are viewed by a camera and are digital image processor recognizable, so that the indicia are converted into information for computer control of a robot in utilizing the diverse parts in assembly operations. The present system is useful in assembly operations wherein the parts can be randomly presented, without special orientation or alignment fixtures, to a robot and yet the robot can utilize the parts in a programmed manner to perform the programmed assembly operations.

26 Claims, 20 Drawing Figures

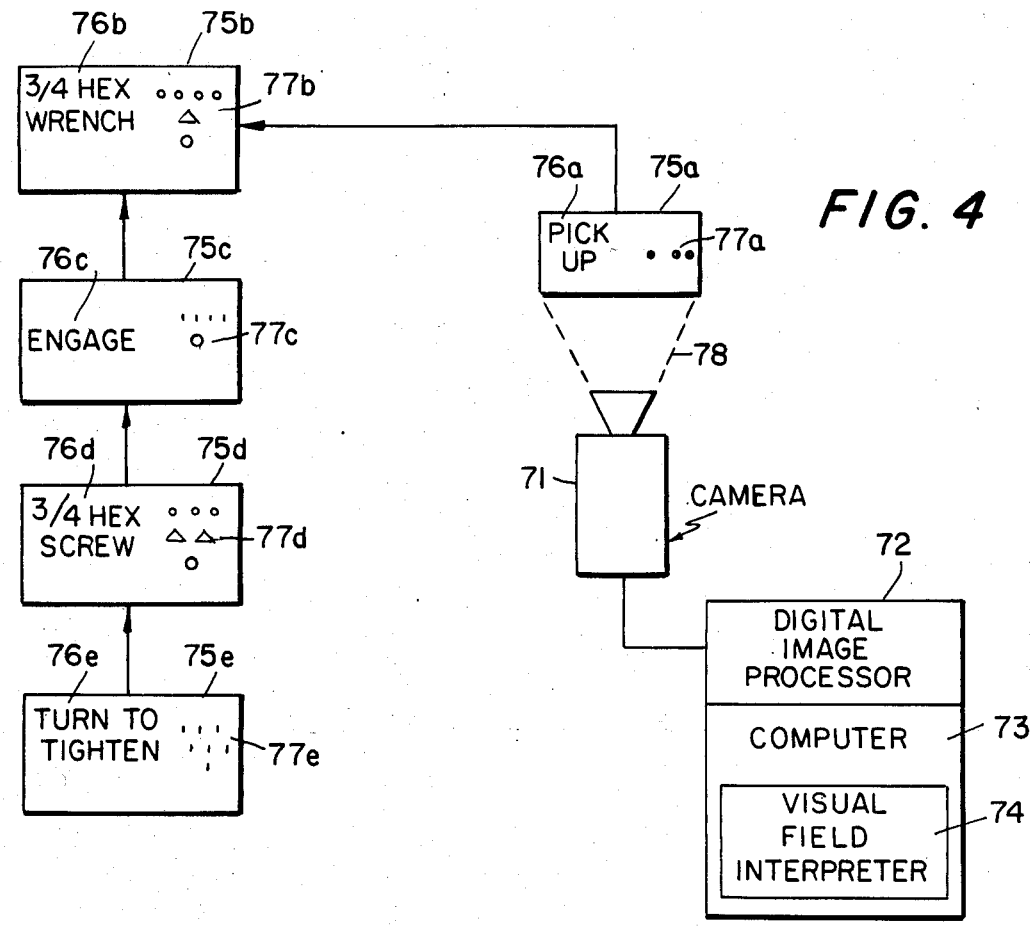
FIG. 4
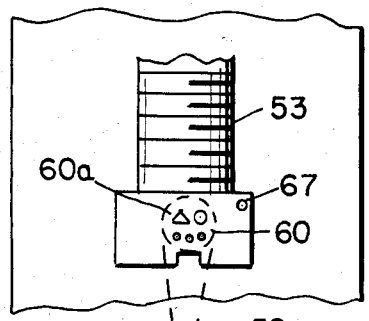
FIG. 5
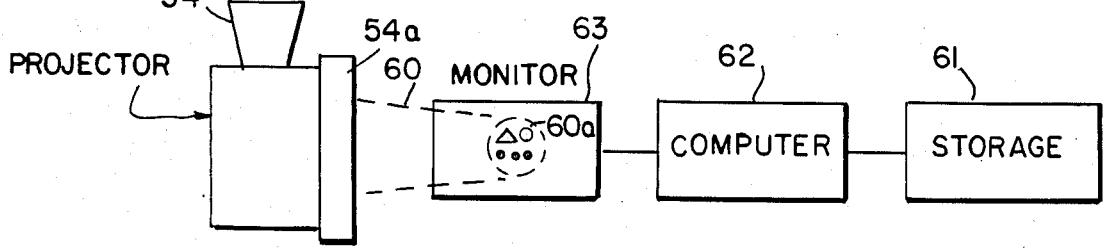

ptions of the invention
ORIENTATION AND CONTROL SYSTEM FOR ROBOTS

RELATED U.S. PATENT APPLICATIONS

This application is a continuation-in-part application of U.S. Ser. No. 350,309, filed Feb. 19, 1982 and now abandoned.

FIELD OF THE INVENTION

This invention relates to robotics. Specifically, this invention relates to an orientation and control system for robots.

BACKGROUND AND DISCUSSION OF THE PRIOR ART

Heretofore it was known in the field of robotics to utilize robots to perform assembly operations with diverse parts. To insure proper use by the robot, it was necessary to provide special orientation apparatus so that parts are accurately in position for use by the robot. In one system, such as is disclosed in "Robot Vision for Industry: The Autovision System" Reinhold, A. G., et al, *Robotics Age*, Fall 1980, pp. 22–28, it was proposed to computer recognize the physical outline or digital image of the part and convey this information to the robot control. This approach was difficult in that unless the part was pre-oriented, the outline recognition became difficult with uncertain results.

Now there is provided by the present invention a system in which coded indicia provide the information for computer control of a robot.

It is therefore a principal object of the present invention to provide a new orientation and control system for robots.

It is another principal object to provide a new programming system for robot operations.

It is another object of present invention to provide a robot system wherein the parts identification, orientation and operations information are encoded on the part.

It is another object of the present invention to provide a robot system wherein operating information is encoded on the robot.

It is another object of the present invention to eliminate the need for specialized orientation of parts for presentation for use by a robot.

It is another object of the present invention to provide a robot orientation and control system in which parts identification does not require recognition of the parts configuration or outline.

It is another object of the present invention to provide a system as aforesaid in which digital image processor recognizable coded indicia is applied to a part.

It is another object of the present invention to provide a system as aforesaid in which there is integrated projection application of the coded indicia on the part with simultaneously viewing and digital image processing of the projected image so as to provide a dynamic robot orientation and control system.

The aforesaid, as well as other objects and advantages as will become apparent from a reading of the following description, taken together with adjoined claims and the accompanying drawings, in which:

DESCRIPTION OF THE DRAWINGS

FIG. 4 is a schematic view of the programming aspect of the present invention;

FIG. 5 is a schematic view of the application of the encoded indicia to part;

FIGS. 10A–10J show the flow chart of visual field interpreter including the robot control program.

SUMMARY OF THE INVENTION

In broad terms, the system provides coded indicia on a part, which indicia are camera viewed and digital image processor recognized so as to be useful in performing robot functions relative to the part. The indicia include part identification, orientation or position, and information relative to the operation to be performed on the part by the robot. The robot may also contain operating instruction indicia relative to the part, whereby a camera views the robot indicia and a computer analyzes the respective parts and robot's indicia and controls the mating or docking of the robot with the part, as well as the operations by the robot using the part. The coded indicia aspect may also be utilized to program the computer. In another aspect, the invention is a system which integrates the camera/processor/computer recognition with a projector for projecting the indicia on a part for assembly operations.

DESCRIPTION OF THE PREFERRED EMBODIEMENT

Figure 1:
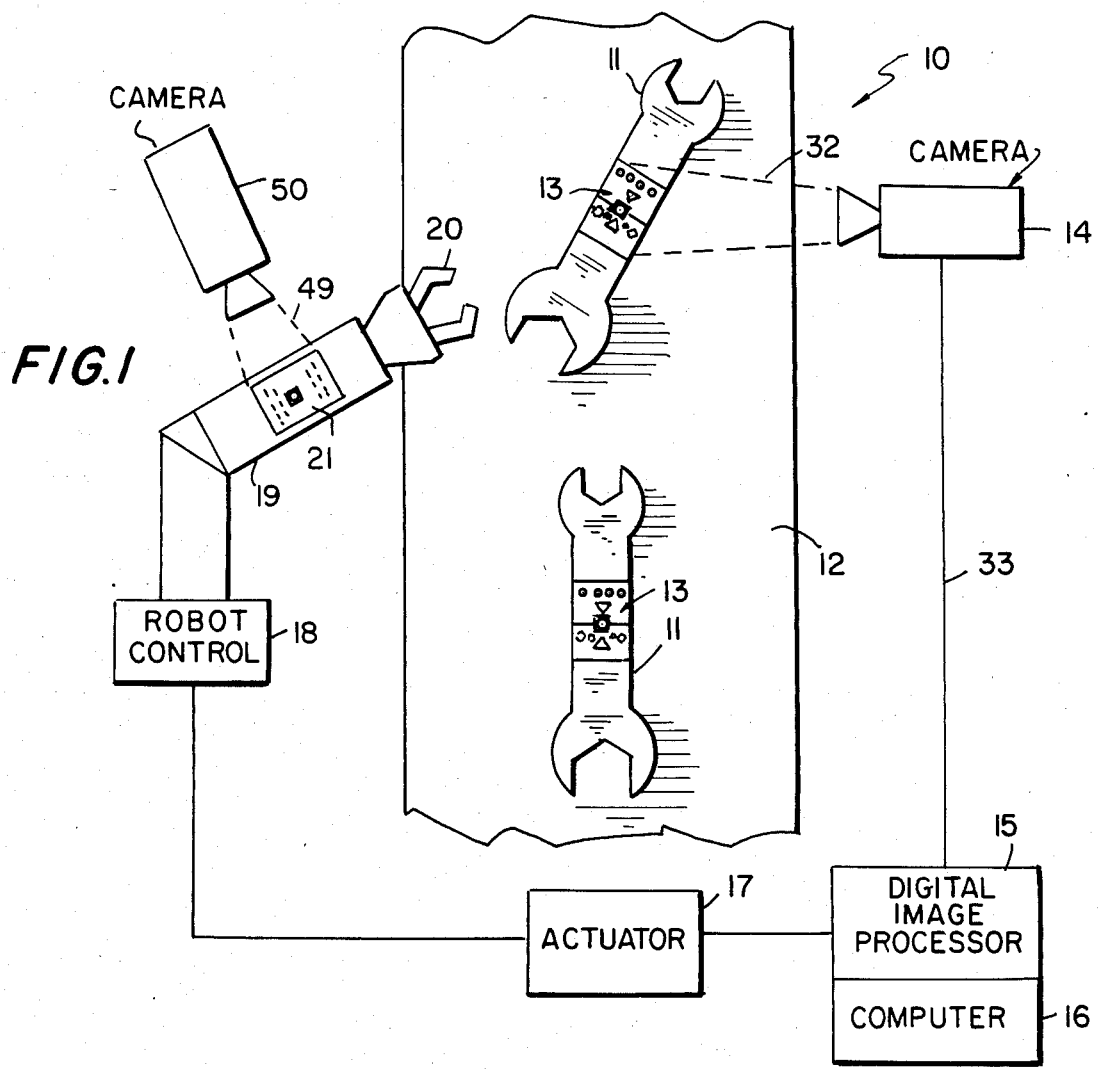
FIG. 1 is a top plan and partial schematic view of the system of the present invention.

Referring to FIG. 1, there is shown the system of the present invention referred to as 10. In general terms, there is shown a part or tool, namely, wrench, 11 disposed on conventional conveyor 12. Wrench 11 comprises coded indicia generally referred to as 13, for purposes hereinafter appearing. Also shown is camera 14, digital image processor 15 and computer 16, actuator 17, robot control mechanism 18, robot arm 19, and robot manipulator 20. A second set of coded indicia 21 is applied to robot arm 19 for purposes more fully explained hereinafter. Camera 14 views indicia 13 in its field of vision 32 so as to receive an indicia image which is then transmitted by connection 33 to digital image processor 15 and computer 16 wherein the coded indicia is recognized and converted to an input signal to actuator 17 for controlling robot arm 19 in relation to the programmed information of the indicia 13. A computer robot controlled system which may be utilized in the present invention is disclosed in U.S. Pat. No. 4,017,721, granted Apr. 12, 1977 to Michaud.

Figure 2:
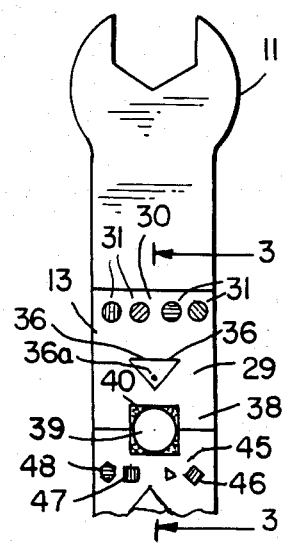
FIG. 2 is an enlarged plan view of the part of FIG. 1.
Figure 3:
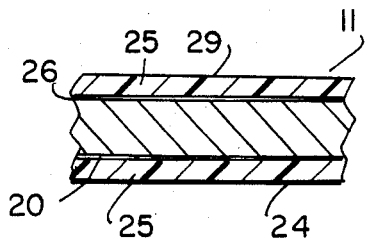
FIG. 3 is a greatly enlarged partial sectional view taken along line 2—3 of FIG. 2.
Figure 6:
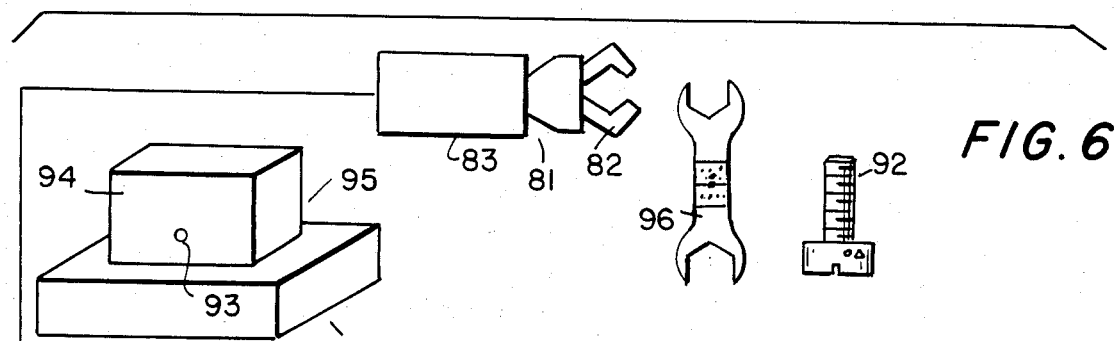
FIG. 6 is a part schematic illustration of integrated camera and projector aspects utilizing the present system, with relation to a specific assembly operation.
Figure 7:
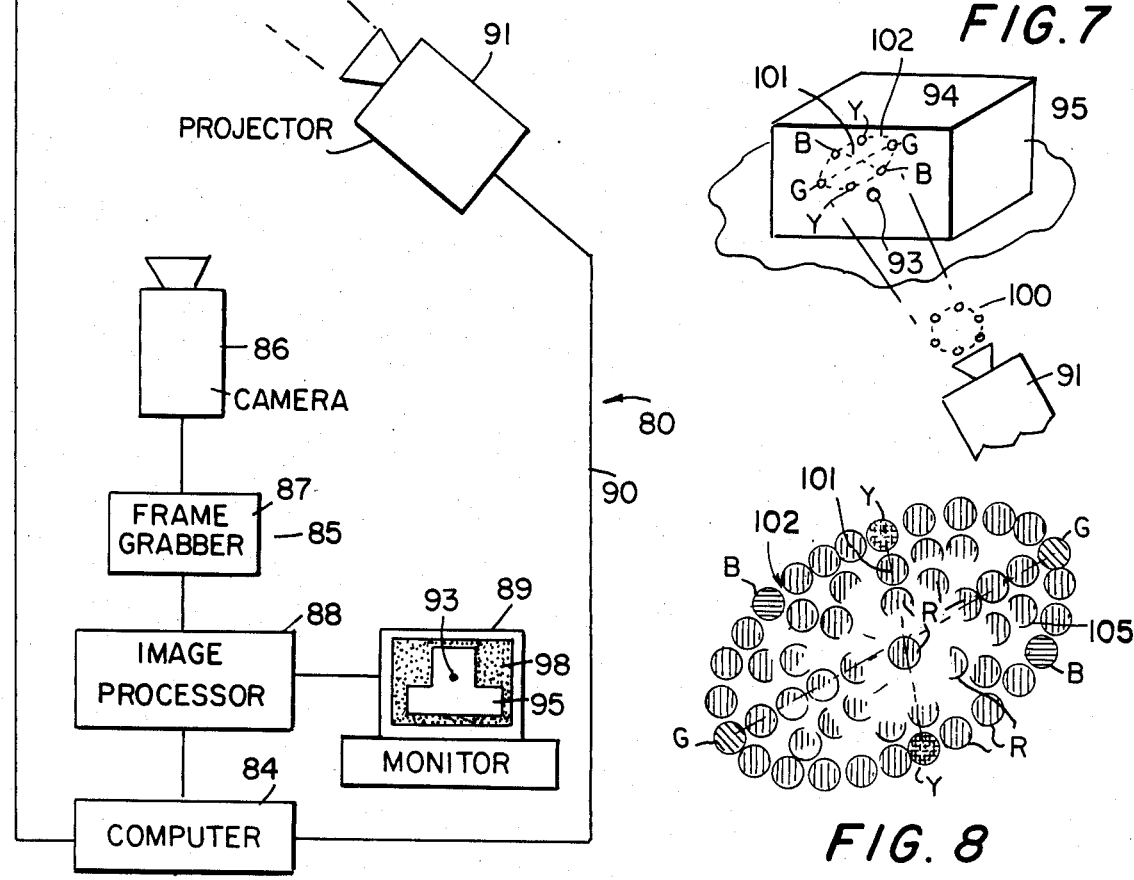
FIG. 7 is the assembly operation of FIG. 6 wherein distance indicia are utilized.

Referring now specifically to FIGS. 2 and 3, there is shown wrench 11, with oppositely disposed labels 25 adhesively secured at 26 to opposed sides 27 and 28 of member 11. Labels 25 are adhesive labels bearing imprinting on one side 29 and adhesive 26 on the other side. The imprinted indicia 13 on label surface 29 forms an important aspect of the present invention. Indicia 13 has a first portion 30 which is formed of a plurality of differently colored dots 31. The color sequence of these dots identifies the part as a specific type of wrench. A second series of indicia 35 is an equilateral triangle 36, with apex dot 36a which when viewed by camera 14 in conjunction with processor 15 and computer 16 determines the orientation or position of the wrench 11. That is, any rotation about the x-y-z axes, presents a specific triangle image to the camera which is match recognized by processor 15 as a specific angular deviation from the equilateral triangle image as would appear in direct top plan view. This angular deviation is also converted to digital inputs to control the robot arm to the rotation angle to align with the specific angular orientation of the wrench. The third set of indicia 38 is a circle 39 contrasted on background 40. The "size" of the circle, in the camera image, determines the distance of the part from a predetermined fixed or reference point. In addition, with angular deviation from direct top plan view, the circle will appear as an ellipse image to the camera; the size of the ellipse may also provide orientation as well as distance information to the processor. A fourth set of indicia 45 comprises a series of differently colored geometric shapes, e.g., 46, 47, 48, which series identifies the operation which is to be performed by the robot arm with the part. That is, the program for the computer is on the part itself, which program instructs the robot to perform the programmed operation as set forth by the indicia. It is to be noted that the two labels on the part are identical, but placed on different or opposite sides, in case the part is flipped over while being conveyed.

In other aspects, certain corresponding identification indicia, orientation and operation indicia for the robot arm may appear on the roboto arm itself, as at 19. Indicia 19 are in the field of view 49 of camera 50. The robot arm indicia image is transmitted to processor 15 and computer 16, which robot arm indicia image information is then compared with the wrench or part indicia image information and instruction input signals are then sent to the robot control for controlling the movement of the robot arm. The continuous robot and part signals provide continuing input for the orientation of the roboto arm with the part or wrench 11, such that there is, in effect, a docking action as the arm, or more specifically, the manipulator 20 as it engages the wrench or part 11. A preferred robot arm is "Hero 1" of Heathkit, Benton Harbor, Mich. 49022.

Suitable digital image processors/computers for the colored indicia include, by way of example, the CAT-100 unit of Digital Graphic Systems, Palo Alto, Calif. 94306 and the Vicom Digital Image Processor, Vicom Systems, Inc., San Jose, Calif. 95131. A most preferred image processor is the "micron Eye" of Micron Technology Incorporated, Boise, Idaho 83706.

While the term camera has been afore-discussed with reference to a television or videcon camera, other viewing means useful in combination with a computer may be employed including CCD chips, such as is described in "New Eyes for Computer: Chips that See," Free, J., *Popular Science*, Vol. 220, No. 1, January 1982, pp. 61-63.

While there is shown the labelling aspect of applying the indicia to the part which labelling may be done by conventional labelling apparatus, it is to be understood that other types of apparatus or systems may be employed to apply the several indicia to the part. A typical labelling apparatus useful in providing indicia bearing labels on an individual part is described in U.S. Pat. No. 3,246,126, granted Apr. 12, 1966, to Schlieben, et al. The indicia may also be formed or molded and painted on the part.

In FIG. 5 there is still a further embodiment, namely, system 51 in which the indicia image 60 is projected as at 52 on the part 53 by means of a projector 54. Projector 54 incorporates a television monitor lens converter 54a, which may be of conventional design as sold by Edmund Scientific Co., Barrington, N.J. That is, for a specific series of the same parts on a conveyor 55, a set of indicia 60a is recalled from storage 61 through computer 62 to video monitor 63 to display image 60, which image is picked-up by converter 54a for transmission to projector 54, which projector 54 projects the indicia image on part 53. An activation or alignment mark 67 may be applied to the part 53 so that camera can align the activation mark, so as to project the indicia image at the desired location on the part 53. With the image projected on the part, the camera system of FIG. 1 can then pick-up the image 60 with indicia 60a for controlling the robot, as previously discussed. One projector system which may be utilized in the present invention is described in U.S. Pat. No. 3,936,596, granted Feb. 3, 1976 to Inulya.

Referring now to FIG. 4, there is shown another aspect of the present invention, namely, programming system 70. System 70 includes a video camera 71 interconnected to digital image processor 72 and computer 73 with visual field interpreter 74. A plurality of sheets or cards 75a-75e are shown in logical sequence representing a series of program instructions for a robot (not shown in FIG. 4). Each card 75a-75e contains a human recognition portion 76a-76e, respectively, and a coded indicia digital image processor recognizable portion 77a-77e, respectively. In this manner of construction, each car in seriatim is flashed in the field of view 78 of camera 71. The human recognition portion and coded indicia portion for each card are corresponding terms so that the user can read portions 76a-76e, while the digital image processor recognizes corresponding portions 77a-77e, so that a user who may not be a computer programmer, can nevertheless arrange the cards in the logical sequence as shown and flash the cards in series to the camera, so that the coded indicia are decoded, and recorded or stored in the computer in the desired sequence as shown. In this manner, the computer has been programmed for a specific operation so as to provide input operation control to the robot. Furthermore, when the parts are on the conveyor, the computer is programmed so that the processor will recognize those parts. One system for locating and transmitting the stored images is described in U.S. Pat. No. 3,868,476, granted Feb. 25, 1975 to Laplume.

The human recognition indicia can be wording or pictorial (e.g., drawings, pictures, diagrams) representations, and the like. While the afore-discussed coded indicia have been discussed in relation to geometric shapes and a plurality of colors, it is understood that other processor recognizable systems such as binary codes, Morse codes, bar codes, and a plurality of variously displaced or moving dots or marks, and combinations thereof can be employed. In addition the coded information can be applied with an ink or paint which is only ultraviolet responsive so as not to mar the part. Infrared or heat systems may also be utilized, particularly for overall part or reference feature recognition, as will be further discussed hereinafter. A typical useful infrared computer recognition system is described in U.S. Pat. No. 3,889,053, granted June 10, 1975 to Lloyd, et al.

In the operation of the present system, the robot can be programmed so that the manipulator pick up a specific part, such as a screw or bolt, and performs an operation on the part such as manipulator insertion in a hole, and then is programmed to pick up a specific tool, such as a wrench which interfits the bolt, and then the manipulator interengages the bolt with the wrench and tightens the bolt as instructed by the program. All the instructions can appear as coded indicia on the tool and part, respectively, and the computer can be programmed to decode the indicia information in accordance with its preprogrammed information, which may be programmed in accordance with the system as shown in FIG. 4.

Referring now to FIGS. 6–9B, there is shown an interactive close loop system utilizing a combination of the robot camera control system of FIG. 1 and the projector programming aspects of FIGS. 4 and 5. With specific reference to FIG. 6, there is shown integrated system 80. System 80 encompasses robot 81 with manipulator arm 82 and robot control 83 interconnected for input from computer 84, which computer 84 is integrally connected to on one hand, input unit 85 which includes camera 86, frame grabber 87, digital image processor 88 with personnel access viewing monitor 89, and computer 84, which computer 84 is also interconnected to indicia output display unit 90 which includes, the indicia projector 91, which units are as aforedescribed. System 80 as disclosed is coded indicia programmed for an assembly operation wherein the robot is to pick up bolt 92, and then engage bolt 92 in threaded hole 93 on flat surface 94 of part 95, and once engaged, robot arm 82 will utilize wrench 96 to tighten bolt 92 in hole 93.

In system 80, it is designed to project the coded indicia onto a specific surface, i.e., 94, juxtaposed to a specific reference feature, i.e., hole 93. As such, a binary digital or infrared image 98 of part 95 may be generated in the manner of the afore-mentioned prior art devices. This initial imaging operation will locate the surface 94 and hole 93 so that the coded indicia may be projected onto surface 94.

Figure 8:
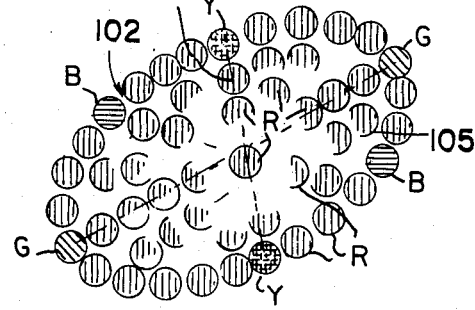
FIG. 8 is a greatly enlarged view of the image processor recognized distance indicia as in FIG. 7.

With surface 94 and hole 93 determined, an indicia circle 100 is projected by projector 91 on surface 94 for distance determination of part 95 in relation to a fixed reference point. Circle 100, of course, when projected onto surface 94 may generate an ellipse 102, because of the specific angular distortion of the part. As such, it is the minor axis 101 of the ellipse which is useful in determining the distance in relation to the circle diameter on a flat surface. To determine the different axes of the ellipse 102, circle 100 is, in fact, a plurality of diametrically disposed, like colored dots, such as blue B, green G and yellow Y in a field of red R dots which form the circle or ellipse pattern (FIG. 8). The digital image processor will then clearly recognize the dots and the computer calculate the axes of the opposed dots and based on the shorter axis of the ellipse, calculate the distance of the ellipse from the camera lens according to the length of the shortest axis. A wide angle lens in combination with a small f stop will provide a depth of field so as to keep the image sharp, in both the camera and projector lenses.

Figure 9A:
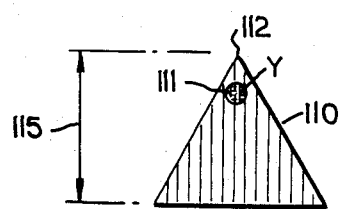
FIGS. 9A–9B represent the orientation indicia for the assembly operation of FIG. 6.
Figure 9B:
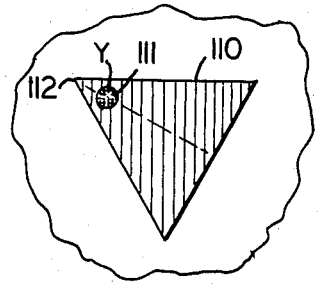
Figure 10A:
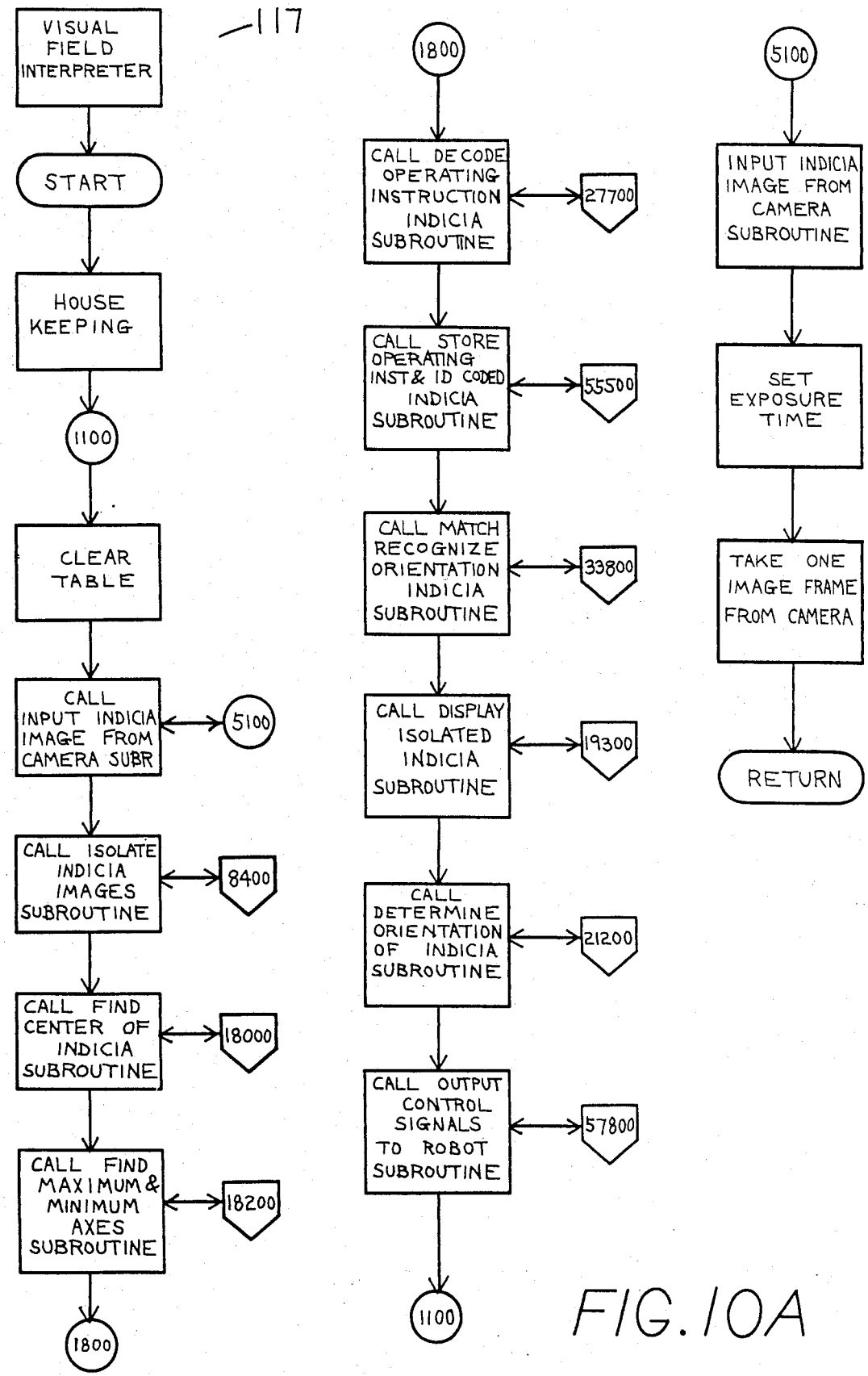
Figure 10B:
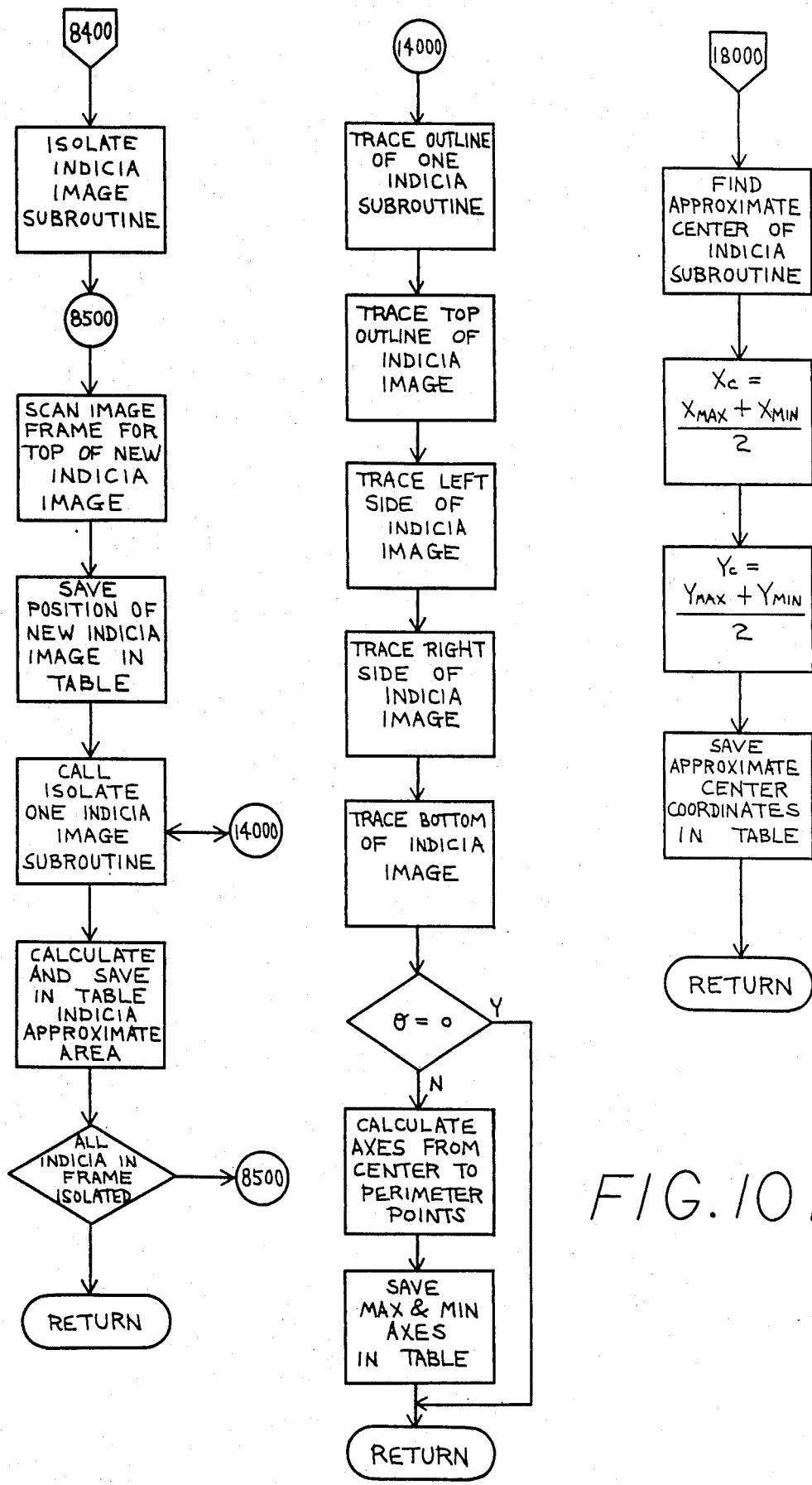
Figure 10C:
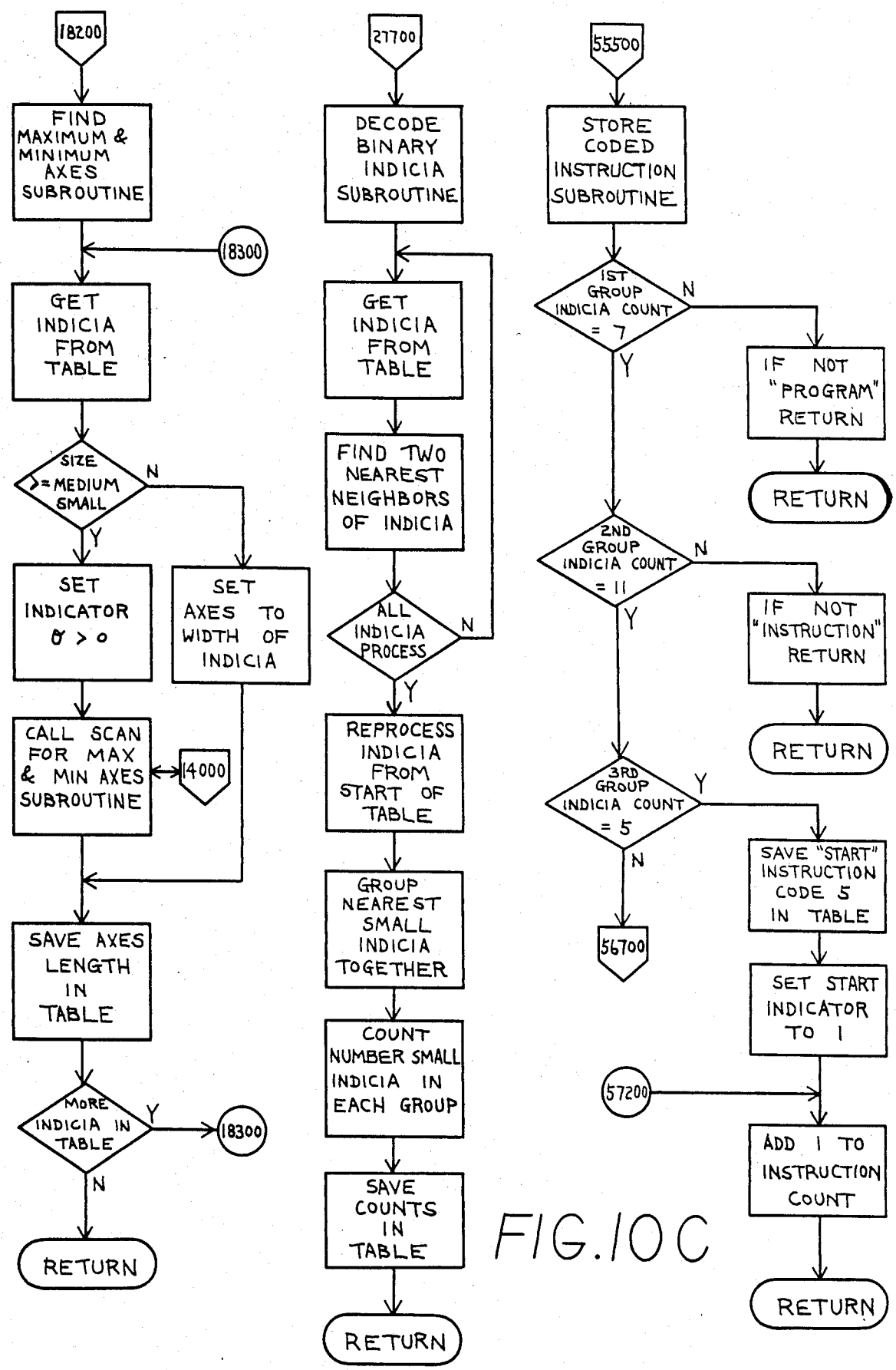
Figure 10D:
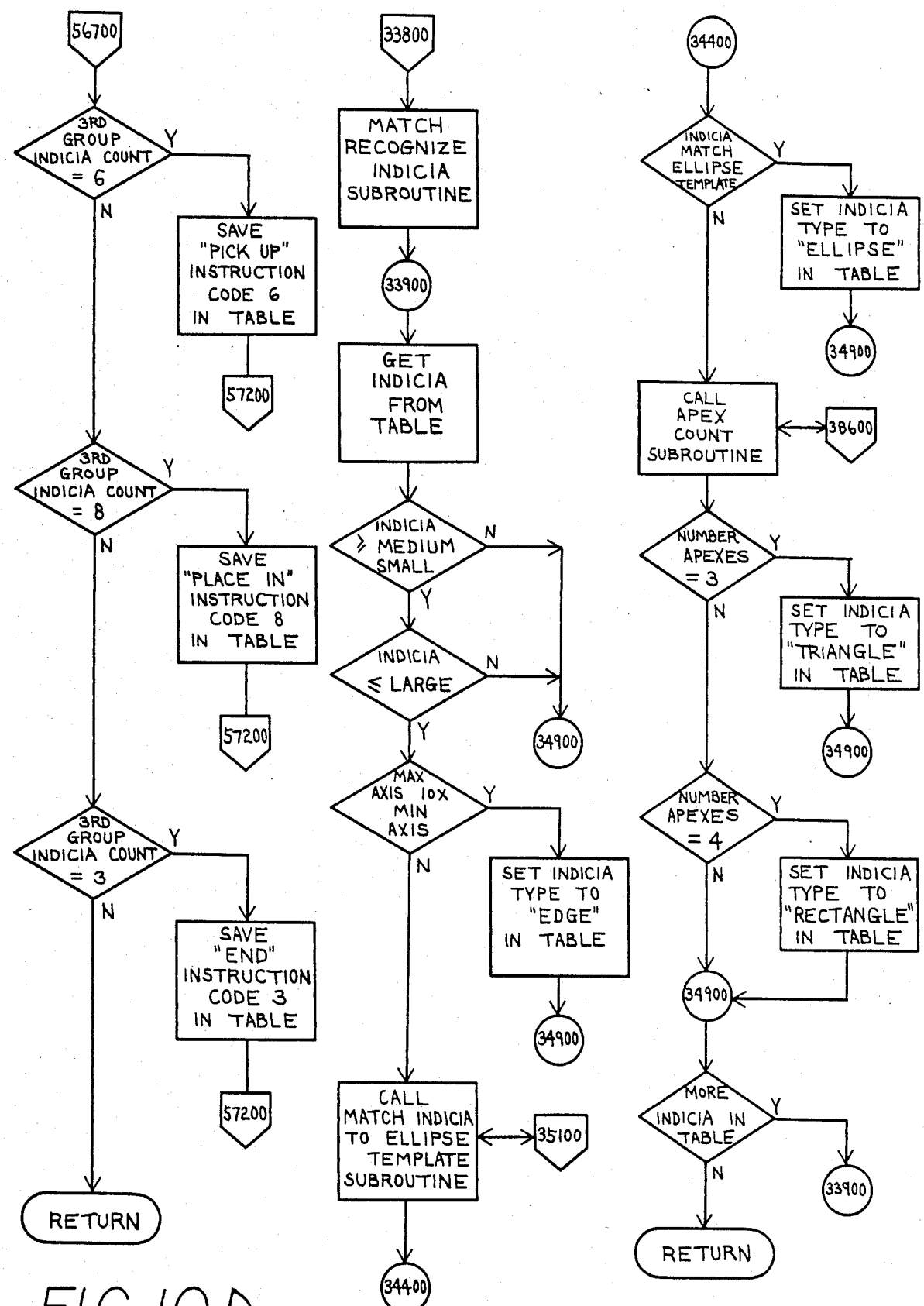
Figure 10E:
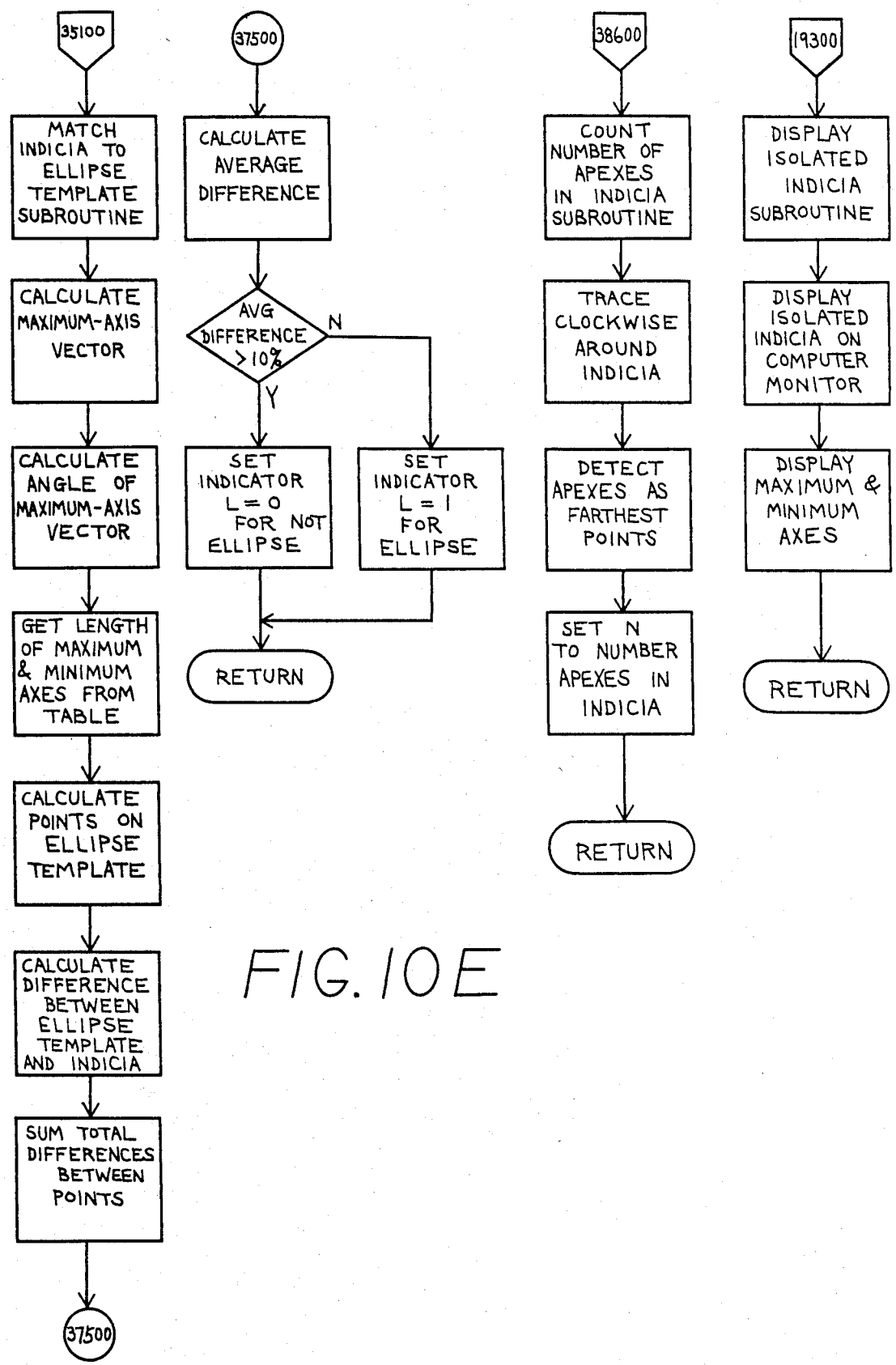
Figure 10F:
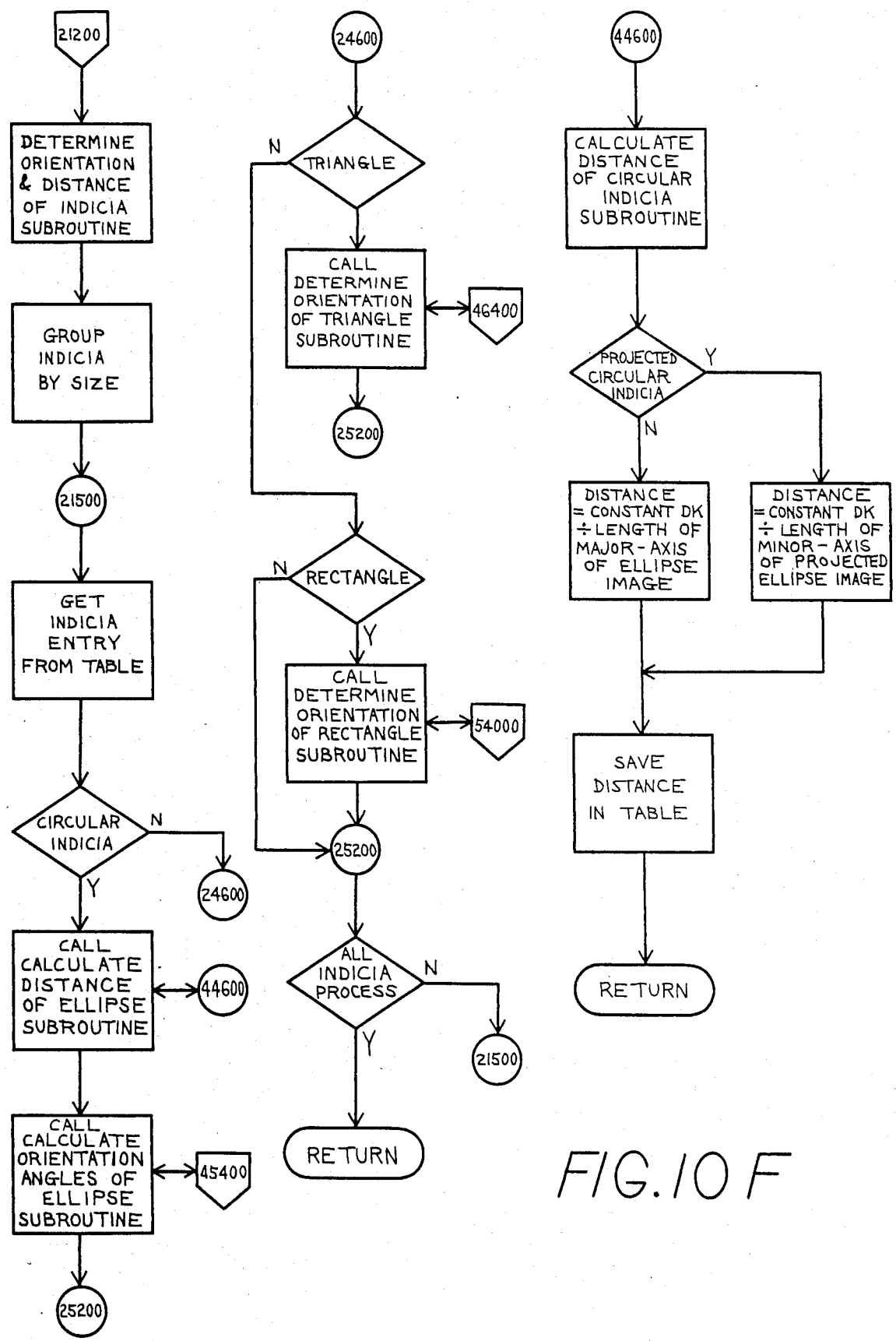
Figure 10G:
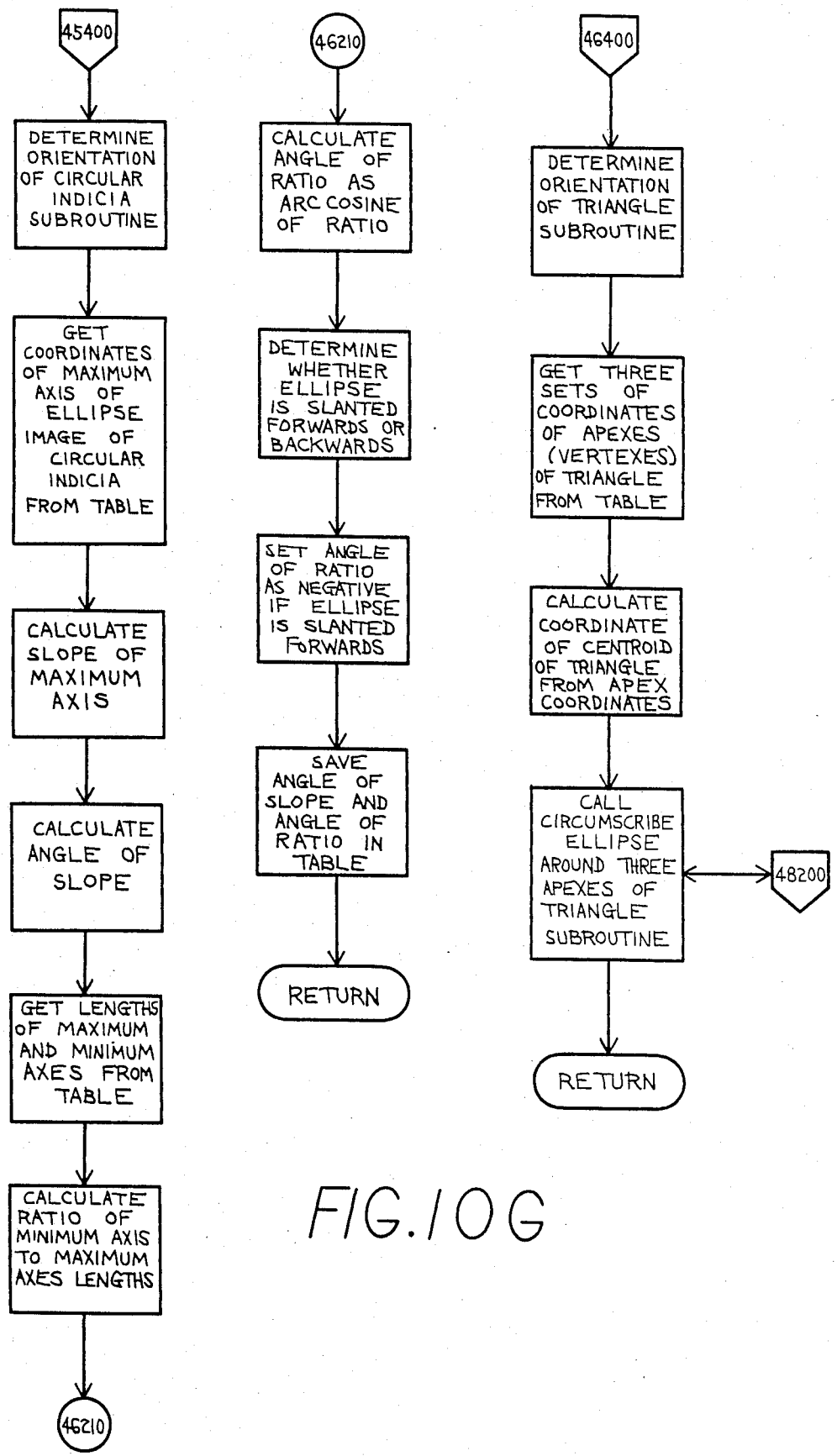
Figure 10H:
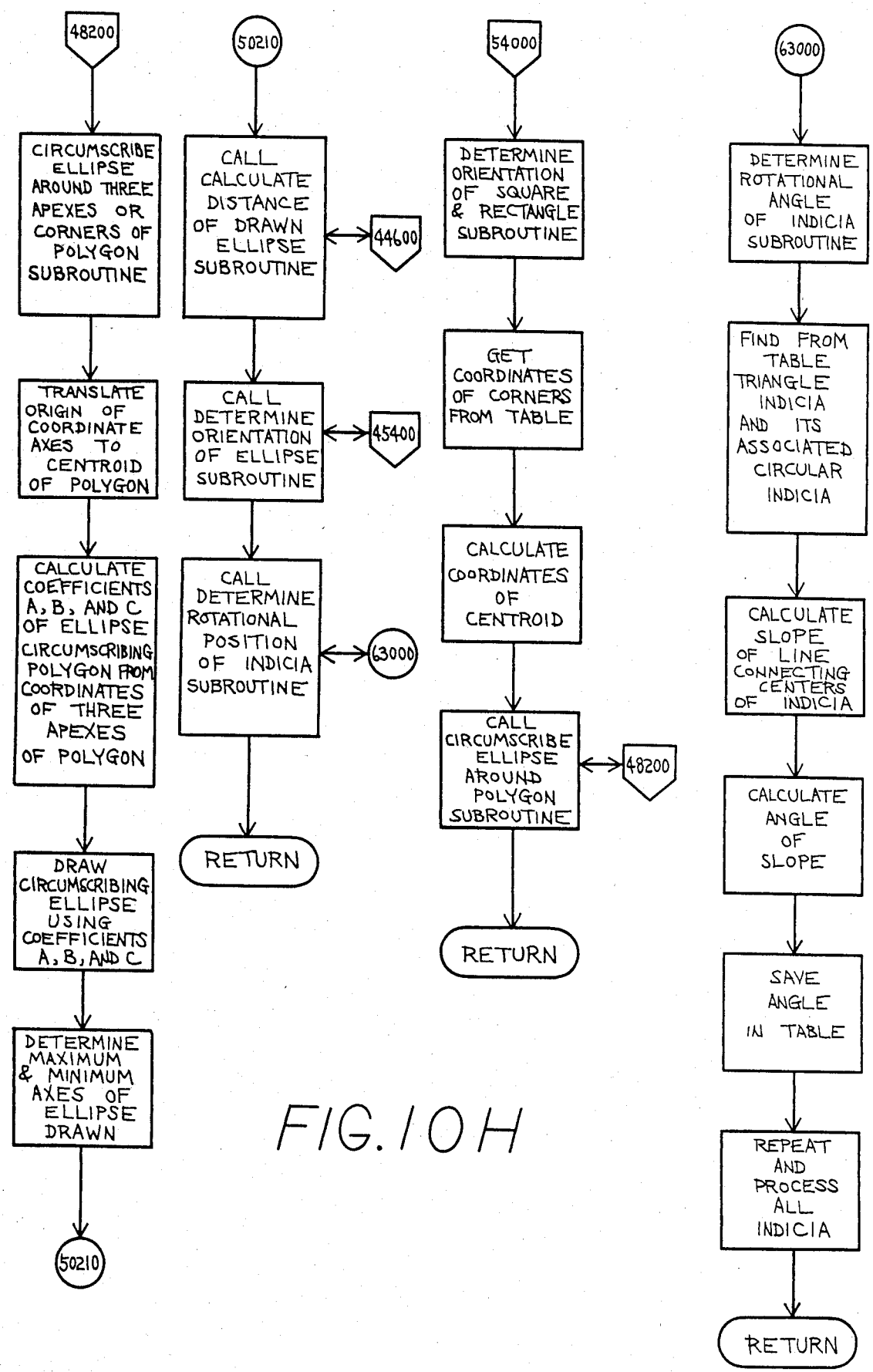
Figure 101:
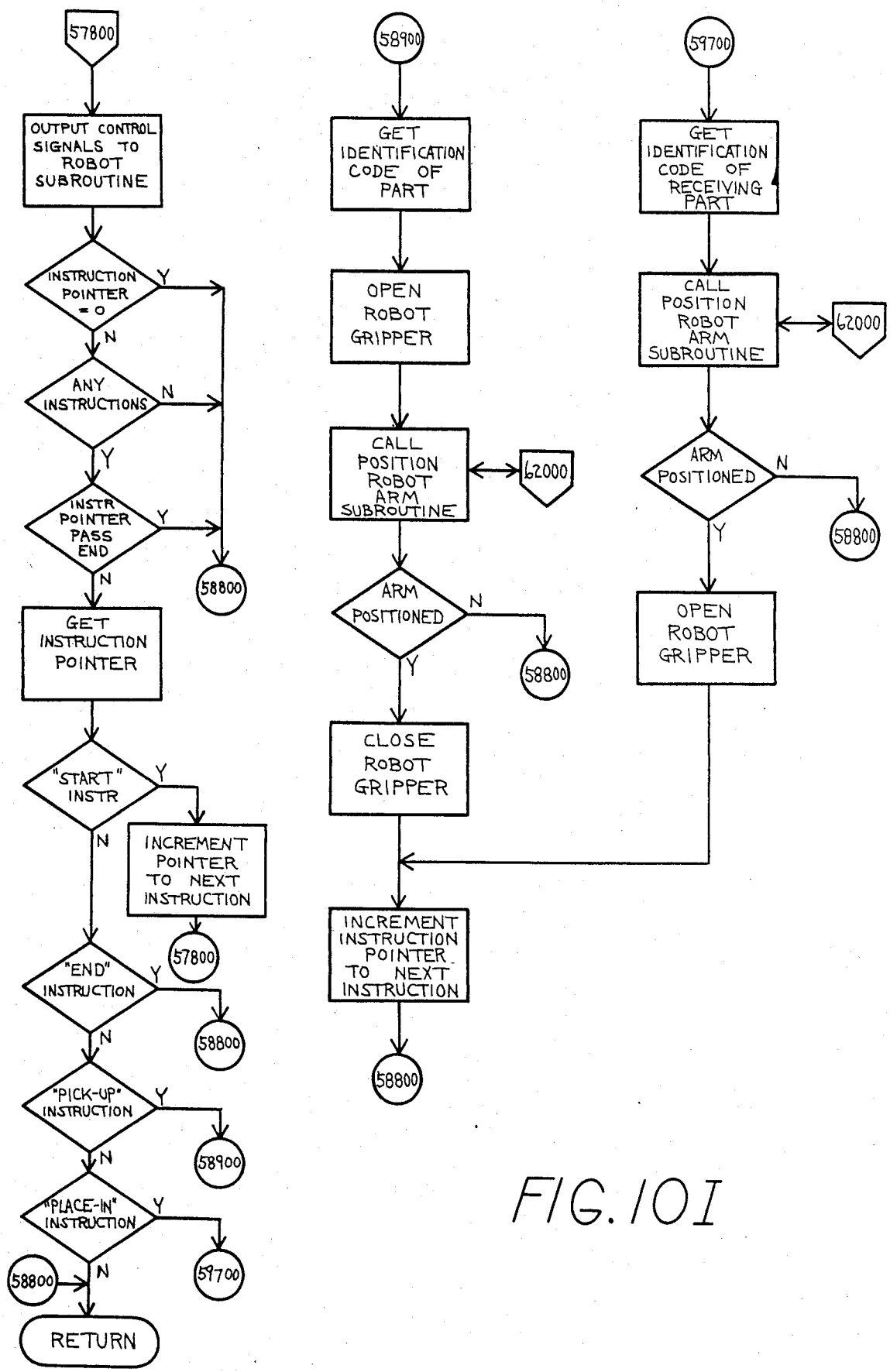
Figure 10J:
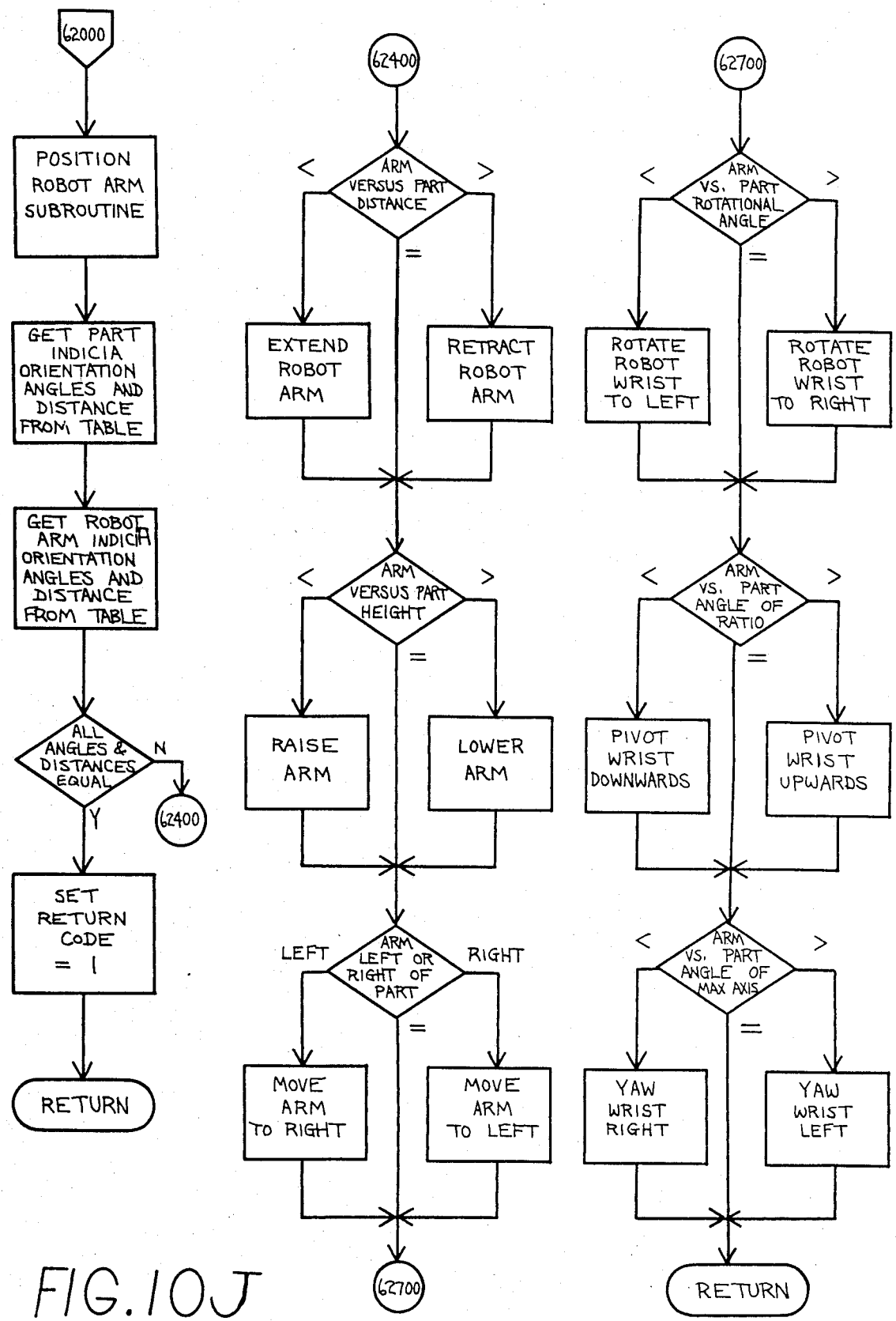

Once distance is determined, the next step is to provide for orientation or angular disposition of part 95. To achieve this, an equilateral red triangle 110 with a yellow dot 111 at one apex 112 is projected on surface 94 (FIGS. 9A–9B). The digital image processor recognizes the triangle, and the computer measures the altitude 115 of the triangle through dot 111, as well as the rotation of the triangle about dot 111. Other differently colored dots may be disposed at the other apices.

With part 95 distance, orientation and hole 93 determinations made, the robot, through coded indicia on the wrench and bolt, can perform the assembly operation in the manner as discused hereinabove.

The following program may be employed in the present invention:

The following program may be employed in the present invention:

```
100  ' VISUAL FIELD INTERPRETER

200  ' HOUSEKEEPING

300  CLEAR 400,&H7E70:'CLEAR COMPUTER MEMORY FOR ASSEMBLY ROUTINES

400  VS=10:SM=50:MS=100:ME=1000:LA=5000:'INDICIA IMAGE SIZE CONSTANTS

500  GOSUB 2600:'LOAD ASSEMBLY ROUTINES

600  PMODE 4,1:SCREEN 1,1:'SET GRAPHICS MODE FOR COMPUTER DISPLAY

700  DIM C(35,30),P(9,1):'DEFINE MAIN AND WORK TABLES

800  AK=2.5:DK=300:PI=3.14159:'DEFINE CONSTANTS

900  PR=0:'SET PROJECTED INDICIA FLAG TO OFF

1000 DEF USR0=&H7F00:DEF USR1=&H7E70:'DEFINE ADDRESS OF ASSEMBLY ROUTINES

1100 'MAIN ROUTINE

1200 FOR M=1 TO 35:FOR N=1 TO 30 :C(M,N)=0:NEXT N:NEXT M:'CLEAR TABLE
```

```
1300 C(0,0)=0:'CLEAR INDICIA IMAGE COUNT

1400 GOSUB 5100:'INPUT INDICIA IMAGES FROM DIGITAL CAMERA

1500 GOSUB 8400:'ISOLATE INDICIA

1600 GOSUB18000:'FIND CENTER

1700 GOSUB18200:'FIND MAXIMUM AND MINIMUM LENGTH AXES

1800 GOSUB27700:'DECODE OPERATING INSTRUCTIONS AND IDENTIFICATION
CODED INDICIA

1900 GOSUB55500:'STORE OPERATING INSTRUCTIONS AND IDENTIFICATION
CODED INDICIA

2000 GOSUB33800:'MATCH RECOGNIZE ORIENTATION INDICIA

2100 GOSUB19300:'DISPLAY ISOLATED INDICIA

2200 GOSUB21200:'DETERMINE ORIENTATION OF ORIENTATION INDICIA, AND
DETERMINE DISTANCE OF ORIENTATION INDICIA FROM CAMERA

2300 GOSUB57800:'OUTPUT CONTROL SIGNALS TO ROBOT

2400 'REPEAT IMAGING AND ROPOT CONTROL CYCLE

2500 GOTO 1100:'GO TO START OF MAIN ROUTINE
2600 'LOAD ASSEMBLY ROUTINES USR0 AND USR1

2700 'USR1

2800 DATA 25,32,2,0,0,198,1,190,126,114,166,132

2900 DATA 129,255,38,6,58,140,30,0,37,244,191,126,114,57

3000 L=&H7E70:GOSUB 4500:'LOAD USR1 ASM PGM

3100 'USR0

3200 DATA 226,134,127,30,139,151,241,134,192,183,255,64,134,40,183,255,64,
173,159,127,210,39,16,151,255,150

3300 DATA 254,132,252,138,1,189,127,167,150,241,31,139,57,150,254,138,3,189,
127,167,23,0,144,142

3400 DATA 6,0,150,254,138,2,214,247,39,2,132,253,132,254,141,102,150,249,
39,54,16,142,0,32

3500 DATA 95,15,240,182,255,64,43,6,10,240,38,247,39,185,182,255,65,193,0,
38,2,167,128,150

3600 DATA 249,39,17,49,63,38,13,193,0,38,4,198,1,32,1,95,16,142,0,32,156,
252,37,209

3700 DATA 32,20,95,182,255,64,43,5,90,38,248,39,138,182,255,65,167,128,156,
252,37,236,150,248
```

3800 DATA 16,39,255,123,15,240,10,240,16,39,255,115,182,255,64,42,245,182,255,65

3900 DATA 32,232,52,21,142,0,8,31,137,86,73,48,31,38,250,246,255,64,196,64

4000 DATA 39,249,183,255,65,53,149,52,21,158,250,39,9,198,170,90,38,253,48,31

4100 DATA 38,247,53,149,18

4200 DATA 127,212,182,127,225,38,7,134,1,183,127,225,134,0,57,0

4300 L=&H7F00:GOSUB 4500:'LOAD USR0

4400 RETURN
4500 READ N:'POKE ASSEMBLY INSTRUCTIONS INTO MEMORY SUBROUTINE

4600 FOR M=1 TO N

4700 READ K

4800 POKE L+M-1,K

4900 NEXT M

5000 RETURN

5100 'INPUT INDICIA IMAGES FROM CAMERA SUBROUTINE

5200 T=100:NU=16:'EXPOSURE TIME CONSTANTS

5300 LH=0:OP=&HD8:'INITIALIZE OPERATION CODE FOR CAMERA

5400 TT=16.666666*NU+50:'CALCULATE CAMERA TO COMPUTER TRANSMISSION TIME

5500 OP=OP+&H20:'SET BIT TO REFRESH CAMERA

5600 GOSUB 7300:'SET CAMERA EXPOSURE TIME

5700 'START CAMERA TO TAKE ONE IMAGE FRAME

5800 POKE &H7FFE,OP:'PASS CAMERA OP CODE TO USR0 CAMERA SUBROUTINE

5900 POKE &H7FF9,LH:'SET CAMERA PICTURE SIZE TO NORMAL SIZE

6000 L9=NU+6:EX=0:IF L9 &H1E THEN L9=&H1E:EX=1:'SET CAMERA TRANSMISSION MODE

6100 POKE &H7FF8,EX:' PASS TRANSMISSION MODE TO USR0 SUBROUTINE

6200 POKE &H7FFC,L9:POKE &H7FFD,0:' SET COMPUTER MEMORY ADDRESS TO STORE CAMERA IMAGE

6300 PCLS 1:SCREEN 1,1:' SET COMPUTER TO DISPLAY IMAGE FROM CAMERA

6400 POKE &H7FE1,0:' SET FLAG FOR CAMERA TO TAKE ONE IMAGE FRAME

6500 A=USR0(0):' CALL CAMERA SUBROUTINE

6600 GOSUB 11600:' ADJUST CAMERA IMAGE HEIGHT TO WIDTH RATIO

```
6700 'CLEAR CAMERA IMAGE BORDERS

6800 LINE(0,0)-(255,0),PSET

6900 LINE(255,0)-(255,191),PSET

7000 LINE(255,191)-(0,191),PSET

7100 LINE(0,191)-(0,0),PSET

7200 RETURN

7300 'POKE EXPOSURE TIME SUBROUTINE

7400 IF T<TT THEN 7600

7500 RS=0:XT=T-TT:GOTO 7700

7600 RS=1:XT=T

7700 IF XT<0 THEN XT=0

7800 T1=INT(XT/256)

7900 T2=INT(XT-(T1*256))

8000 POKE &H7FFA,T1

8100 POKE &H7FFB,T2

8200 POKE &H7FF7,RS

8300 RETURN

8400 F=0:'    ISOLATE INDICIA SUBROUTINE

8500 FOR I=1 TO 190

8600 FOR J=0 TO 255:'    SCAN IMAGE

8700 GOSUB 9400:'   CALL ASSEMBLY SCAN SUBROUTINE

8800 IF I>190 THEN 9300

8900 IF L=1 THEN 9000

9000 IF PPOINT(J,I)=0 THEN 10700

9100 NEXT J

9200 NEXT I

9300 RETURN

9400 ' CALL ASM SCAN SUBROUTINE

9500 A=INT(J/8):K=J-A*8:'    CALCULATE IMAGE BYTE ADDRESS

9600 IF K=0 THEN 9800:'    TEST IF IMAGE POINT IS ON BYTE BOUNDARY

9700 L=1:GOTO 10600:'    RETURN IF NOT

9800 L=I*32+A+1536:'    CONVERT ROW-COLUMN TO MEMORY ADDRESS

9900 C=INT(L/256):D=L-C*256

10000 POKE &H7E72,C:POKE &H7E73,D:'    PASS IMAGE ADDRESS TO SUBR
```

```
10100 L=USR1(0):'            CALL IMAGE SCAN SUBROUTINE

10200 C=PEEK(&H7E72):D=PEEK(&H7E73):'   GET RETURNED IMAGE POINT ADDR

10300 L=C*256+D-1536:'        CONVERT ON IMAGE POINT ADDR TO ROW-COLUMN

10400 I=INT(L/32):J=(L-I*32)*8

10500 L=0:'                   SET RETURN CODE

10600 RETURN

10700 GOSUB 12600:'           SKIP INDICIA IMAGE ALREADY SCANNED

10800 IF L=1 THEN 9100:'      GO SCAN IMAGE AFTER SKIP OVER SCANNED INDICIA

10900 F=F+1:C(F,13)=I:C(F,14)=J:C(F,1)=999:C(F,2)=999:'  SAVE ROW & COLUMN NUM
OF FIRST POINT IN NEW INDICIA IMAGE SCANNED BY PROGRAM

11000 C(F,3)=-1:C(F,4)=-1:C(F,11)=-1:C(F,12)=999:X=I-1:Y=J:GOSUB 13400:' SAVE
MINIMUM ROW COLUMN NUMBERS OF INDICIA IMAGE

11100 O=0:GOSUB 14000:'       ISOLATE 1 INDICIA

11200 C(F,15)=F:A=ABS(C(F,1)-C(F,3)):B=ABS(C(F,2)-C(F,4)):'  CALCULATE
MAXIMUM WIDTH AND HEIGHT OF ISOLATED INDICIA IMAGE

11300 IF A<B THEN A=B:'       GET MAXIMUM WIDTH OR HEIGHT OF INDICIA

11400 C(F,16)=A*A:'           CALCULATE APPROXIMATE AREA OF INDICIA

11500 GOTO 9100:'             GO FIND NEXT INDICIA IN CAMERA IMAGE

11600 'ADJUST IMAGE HEIGHT WIDTH RATIO OF CAMERA

11700 FOR Y=0 TO 128:'        SCAN CAMERA IMAGE IN MEMORY FROM ROWS 0 - 128

11800 A=INT(Y/AK):'           REDUCE HEIGHT OF CAMERA IMAGE BY CONSTANT AK

11900 FOR X=0 TO 255:'        TRANSFER POINTS IN ROW TO NEW ROW
12000 K=PPOINT(X,Y)

12100 IF K<>0 THEN 12300

12200 PSET(X,A,0):PSET(X,Y,1)

12300 NEXT X

12400 NEXT Y

12500 RETURN

12600 L=0:'SKIP SCANNING INDICIA IMAGE ALREADY ISOLATED SUBROUTINE

12700 IF F=0 THEN 13300:'     RETURN IF INDICIA ISOLATED COUNT IS ZERO

12800 FOR M=1 TO F:'          F IS ISOLATED INDICIA COUNT

12900 IF I=>C(M,1) AND I<=C(M,3) THEN 13000 ELSE 13200:'  IF IMAGE POINT
FALLS WITHIN AREA OF ALREADY ISOLATED INDICIA?

13000 IF J=>C(M,2) AND J<=C(M,4) THEN 13100 ELSE 13200
```

```
13100 L=1:J=C(M,4)+1:GOTO 13300:'    INCREMENT COLUMN TO BE SCANNED TO
RIGHT OF INDICIA ALREADY SCANNED

13200 NEXT M

13300 RETURN

13400 ' SAVE MAXIMUM AND MINIMUM COORDINATES OF ISOLATED INDICIA SUBR

13500 IF X<C(F,1) THEN C(F,1)=X

13600 IF Y<C(F,2) THEN C(F,2)=Y

13700 IF X>C(F,3) THEN C(F,3)=X

13800 IF Y>C(F,4) THEN C(F,4)=Y

13900 RETURN

14000 ' ISOLATE ONE INDICIA IMAGE SUBROUTINE

14100 S=I-1:T=J:U=I-1:V=J:'       INITIALIZE ROW AND COLUMN NUMBERS

14200 Z=1:X=S:Y=T

14300 GOSUB 15300:'       TRACE OUTLINE ON RIGHT SIDE OF INDICIA

14400 S=X:T=Y

14500 IF O=0 THEN GOSUB 13400

14600 Z=-1:X=U:Y=V

14700 GOSUB 15300:'       TRACE OUTLINE ON LEFT SIDE OF INDICIA

14800 U=X:V=Y

14900 IF O=0 THEN GOSUB 13400

15000 GOSUB 16500:'       TRACE BOTTOM OF INDICIA

15100 IF L=1 THEN 15200 ELSE 14200

15200 RETURN

15300 XS=X:YS=Y:' TRACE ONE OUTLINE ROW OF INDICIA SUBROUTINE

15400 X=X+1

15500 IF PPOINT(Y,X)=5 THEN 16300

15600 IF O<>0 THEN GOSUB 20500:'   FIND MAX & MIN RADIUS

15700 Y=Y+Z:X=X-1

15800 IF Y>254 OR Y<1 THEN 16400

15900 IF PPOINT(Y,X)=5 THEN 16300

16000 IF O<>0 THEN GOSUB 20500:'   FIND MAX & MIN AXES

16100 X=X-1

16200 GOTO 15900

16300 IF X>XS THEN 16400 ELSE 15400
```

```
16400 RETURN

16500 L=0:'   TRACE BOTTOM OF INDICIA SUBROUTINE

16600 IF T=V THEN L=1 ELSE 16800

16700 RETURN

16800 Q=T

16900 Q=Q-1

17000 IF Q=V THEN L=1 ELSE 17200

17100 GOTO 16700

17200 IF PPOINT(Q,S)<>5 THEN 17300 ELSE 16900
17300 IF O=0 THEN 16700:'     RETURN IF NOT CALLED TO FIND AXES

17400 M=X:N=Y:X=S:Y=Q:GOSUB 20500:X=M:Y=N

17500 Q=V

17600 Q=Q+1

17700 IF Q=T THEN 16700

17800 IF PPOINT(Q,S)=5 THEN 17600

17900 M=X:N=Y:X=S:Y=Q:GOSUB 20500:X=M:Y=N:GOTO 16700

18000 'FIND APPROXIMATE CENTER OF INDICIA SUBROUTINE

18100 FOR M=1 TO F:C(M,5)=(C(M,1)+C(M,3))/2:C(M,6)=(C(M,2)+C(M,4))/2:
NEXT:RETURN

18200 'DETERMINE MAXIMUM AND MINIMUM AXES    OF INDICIA IMAGE

18300 FOR O=1 TO F

18400 IF C(O,16)=>MS THEN 18800

18500 C(O,11)=ABS(C(O,1)-C(O,3)):C(O,12)=C(O,11)

18600 C(O,7)=C(O,13):C(O,8)=C(O,14):C(O,9)=C(O,13):C(O,10)=C(O,14)

18700 GOTO 19100

18800 I=C(O,13):J=C(O,14)

18900 GOSUB 14000:'      TRACE ONE INDICIA, AND FIND AXES

19000 C(O,11)=SQR(C(O,11)):C(O,12)=SQR(C(O,12)):' SAVE MAX & MIN AXES LENGTH

19100 NEXT O

19200 RETURN

19300 'DISPLAY ISOLATED INDICIA ON COMPUTER DISPLAY

19400 FOR N=1 TO F

19500 A=C(N,1):B=C(N,2):C=C(N,3):D=C(N,4):X=INT(C(N,5)):Y=INT(C(N,6))

19600 LINE(B,A)-(B,C),PRESET:LINE(B,C)-(D,C),PRESET
```

```
19700 LINE(D,C)-(D,A),PRESET:LINE(D,A)-(B,A),PRESET

19800 E=PPOINT(Y,X):PRESET(Y,X)

19900 'DISPLAY AXES

20000 IF C(N,7)=0 AND C(N,8)=0 THEN 20300

20100 A=C(N,5):B=C(N,6):C=C(N,7):D=C(N,8):G=C(N,9):H=C(N,10)

20200 LINE(B,A)-(D,C),PRESET:LINE(B,A)-(H,G),PRESET

20300 NEXT

20400 RETURN

20500 A=C(O,5):B=C(O,6):'    SCAN FOR MAXIMUM AND MINIMUM AXES SUBROUTINE

20600 R=(A-X)*(A-X)+(B-Y)*(B-Y)

20700 IF R> C(O,11) THEN 20800 ELSE 20900

20800 C(O,11)=R:C(O,7)=X:C(O,8)=Y

20900 IF R<C(O,12) THEN 21000 ELSE 21100

21000 C(O,12)=R:C(O,9)=X:C(O,10)=Y

21100 RETURN

21200 'DETERMINE ORIENTATION OF INDICIA, AND DISTANCE OF INDICIA FROM CAMERA

21300 GOSUB 25800:'       GROUP INDICIA BY SIZE

21400 IF F=0 THEN 25400:' RETURN IF NO INDICIA IN IMAGE

21500 FOR LL=1 TO F:'    SET UP LOOP TO PROCESS INDICIA

22800 X=C(LL,15):A$="":'   GET INDICIA TYPE SET BY MATCH RECOGNITION ROUTINE

22900 IF X<1000 THEN 24600

23000 Y=INT(X/1000)

23100 IF Y<>1 THEN 23300

23200 A$="EDGE":GOTO 24100

23300 IF Y<>2 THEN 23500

23400 A$="ELLIPSE":GOTO 24100

23500 IF Y<>3 THEN 23700

23600 A$="TRIANGLE":GOTO 24100

23700 IF Y<>4 THEN 23900
23800 A$="RECTANGLE":GOTO 24100

23900 A$=""

24100 IF A$ <>"ELLIPSE" THEN 24600
```

```
24200 GOSUB 44600:'      CALCULATE DISTANCE OF ELLIPSE FROM CAMERA

24400 GOSUB 45400:'      CALCULATE ORIENTATION ANGLES OF ELLIPSE

24500 GOTO 25200

24600 IF A$<>"TRIANGLE" THEN 24800

24700 GOSUB 46400:GOTO 25200:' CALCULATE ORIENTATION ANGLES OF TRIANGLE

24800 IF A$<>"RECTANGLE" THEN 25200

24900 GOSUB 54000:'      CALCULATE ORIENTATION ANGLES IN THREE
DIMENSIONS OF RECTANGLE, SQUARE, OR BAR CODE

25200 NEXT LL

25400 RETURN

25800 'GROUP INDICIA BY SIZE SUBROUTINE

25900 C(0,0)=F:'         SAVE NUMBER OF INDICIA IN IMAGE IN TABLE

26000 IF F=0 THEN 27600

26100 FOR M=1 TO 6:C(M,0)=0:NEXT:'   CLEAR COUNTERS

26200 FOR M=1 TO F

26300 K=C(M,16):'        GET INDICIA AREA FROM TABLE

26400 IF K>VS THEN 26600

26500 C(1,0)=C(1,0)+1:GOTO 27500:' ADD TO VERY SMALL SIZE INDICIA COUNT

26600 IF K>SM THEN 26800

26700 C(2,0)=C(2,0)+1:GOTO 27500:' ADD TO SMALL SIZE INDICIA COUNT

26800 IF K>MS THEN 27000

26900 C(3,0)=C(3,0)+1:GOTO 27500:' ADD TO MEDIUM SMALL SIZE COUNT

27000 IF K>ME THEN 27200

27100 C(4,0)=C(4,0)+1:GOTO 27500:' ADD TO MEDIUM SIZE INDICIA COUNT

27200 IF K>LA THEN 27400

27300 C(5,0)=C(5,0)+1:GOTO 27500:' ADD TO LARGE SIZE INDICIA COUNT

27400 C(6,0)=C(6,0)+1:'          ADD TO VERY LARGE SIZE INDICIA COUNT

27500 NEXT

27600 RETURN

27700 'DECODE BINARY INDICIA SUBROUTINE

27800 IF F<>0 THEN 28000

27900 C(0,1)=0:GOTO 33700

28000 S=1:T=F:GOSUB 28100:GOTO 30200
```

```
28100 'FIND TWO NEAREST NEIGHBOR INDICIA FOR EACH INDICIA SUBROUTINE

28200 IF S=T THEN 30100

28300 FOR M=S TO T:FOR N=17 TO 20:C(M,N)=0:NEXT N:NEXT M

28400 FOR M=S TO T

28500 IF C(M,16)<SM THEN 29900

28600 FOR N=S TO T

28700 IF M=N THEN 29800

28800 IF C(N,16)<SM THEN 29800

28900 A=C(M,5)-C(N,5):B=C(M,6)-C(N,6):R=A*A+B*B

29000 IF C(M,17)<>0 THEN 29200

29100 C(M,17)=N:C(M,18)=R:GOTO 29800

29200 IF C(M,19)<>0 THEN 29400

29300 C(M,19)=N:C(M,20)=R:GOTO 29800

29400 IF R<C(M,18) OR R<C(M,20) THEN 29500 ELSE 29800

29500 IF C(M,18)>C(M,20) THEN 29600 ELSE 29700

29600 C(M,18)=R:C(M,17)=N:GOTO 29800

29700 C(M,20)=R:C(M,19)=N

29800 NEXT N

29900 NEXT M

30000 FOR M=1 TO F:C(M,18)=SQR(C(M,18)):C(M,20)=SQR(C(M,20)):NEXT M

30100 RETURN

30200 'COUNT NUMBER OF INDICIA IN INSTRUCTION CODE INDICIA

30300 S=0

30400 FOR M=1 TO F

30500 A=M

30600 IF C(M,11)>0 THEN 30800

30700 C(M,11)=-C(M,11):GOTO 33400

30800 IF C(M,16)<SM OR C(M,16)>MS THEN 30700

30900 S=S+1:N=1:C(M,11)=-C(M,11)

31000 X=C(A,17):Y=C(A,19)

31100 IF X=0 THEN 31700

31200 IF C(X,11)<0 THEN 31600

31300 IF C(X,16)<VS OR C(X,16)>MS THEN 31600
```

```
31400 IF C(A,18)>ABS(5*C(A,11)) THEN 31600

31500 GOTO 31700

31600 X=0

31700 IF Y=0 THEN 32300

31800 IF C(Y,11)<0 THEN 32200

31900 IF C(Y,16)<VS OR C(Y,16)>MS THEN 32200

32000 IF C(A,20)>ABS(5*C(A,11)) THEN 32200

32100 GOTO 32300

32200 Y=0

32300 IF X=0 AND Y=0 THEN 33300

32400 IF X=0 OR Y=0 THEN 32700

32500 IF C(A,18)<=C(A,20) THEN Z=1 ELSE Z=2

32600 GOTO 32800

32700 IF X=0 THEN Z=2 ELSE Z=1

32800 N=N+1

32900 IF Z<>1 THEN 33200

33000 C(X,11)=-C(X,11):A=X

33100 GOTO 31000

33200 C(Y,11)=-C(Y,11):A=Y:GOTO 31000

33300 C(0,S+1)=N:C(M,27)=N

33400 NEXT M

33500 C(0,1)=S

33600 FOR M=1 TO F:C(M,11)=ABS(C(M,11)):NEXT

33700 RETURN

33800 'MATCH RECOGNIZE INDICIA SUBROUTINE

33900 FOR M=1 TO F

34000 IF C(M,16)<MS OR C(M,16)>LA THEN 34900

34100 IF (C(M,12)/C(M,11))>.1 THEN 34300

34200 C(M,15)=C(M,15)+1000:GOTO 34900

34300 GOSUB 35100:'     MATCH RECOGNIZE IF INDICIA IS ELLIPSE

34400 IF L<>1 THEN 34600

34500 C(M,15)=C(M,15)+2000:GOTO 34900:'   IF ELLIPSE, SET INDICATOR

34600 GOSUB 38600:'     MATCH RECOGNIZE IF INDICIA IS TRIANGLE
```

```
34700 IF N<>3 THEN 34810

34800 C(M,15)=C(M,15)+3000:GOTO 34900:'   IF INDICIA IS TRIANGLE, SET INDICATOR

34810 IF N<>4 THEN 34900:'     TEST IF INDICIA IS RECTANGLE, OR BAR CODE

34820 C(M,15)=C(M,15)+4000:GOTO 34900:'   SET INDICATOR IF RECT OR BAR CODE

34900 NEXT M

35000 RETURN

35100 E=0:'  MATCH INDICIA TO ELLIPSE TEMPLATE

35200 X=C(M,6)-C(M,8):'    CALCULATE SLOPE OF MAXIMUM INDICIA AXIS

35300 IF ABS(X)>.001 THEN 35500:'    TEST FOR ZERO DENOMINATOR

35400 IF X=>0 THEN X=.001 ELSE X=-.001

35500 QM=(C(M,7)-C(M,5))/X:G=ABS(QM):G=ATN(G):'CALCULATE SLOPE OF AXIS

35600 IF QM<0 THEN G=PI-G:'    RECALCULATE IF SLOPE NEGATIVE

35700 A=C(M,11):KM=INT(A):A=A*A:' GET LENGTH OF MAJOR AXIS OF ELLIPSE

35800 B=C(M,12):B=B*B:'        GET LENGTH OF MINOR AXIS OF ELLIPSE

35900 FOR N=0 TO KM

36000 H=SQR(B*(1-N*N/A)):' CALCULATE POINT ON ELLIPSE AND ROTATE TO

NEW COORDINATE ACCORDING TO SLOPE OF MAJOR AXIS

36100 R=SQR(N*N+H*H)

36200 IF N<.001 THEN T=PI/2 ELSE T=ATN(H/N)

36300 U=T+G:V=G-T

36400 JN=INT(R*COS(U)):IN=INT(R*SIN(U)):' COORDINATE ROTATIONAL FORM LAS

36500 JP=INT(R*COS(V)):IP=INT(R*SIN(V))

36600 J0=INT(C(M,6)):I0=INT(C(M,5))

36700 K=C(M,1):L=C(M,3):'       GET UPPER AND LOWER BOUNDARIES

OF INDICIA

36800 X=J0+JN:Y=I0-IN:GOSUB 37900:E=E+Z:' COMPARE CALCULATED POINT ON

ELLIPSE WITH SCANNED IMAGE POINT ON INDICIA IMAGE, AND SAVE THE

DIFFERENCE E

36900 X=J0+JP:Y=I0-IP:GOSUB 37900:E=E+Z

37100 X=J0-JN:Y=I0+IN:GOSUB 37900:E=E+Z

37200 X=J0-JP:Y=I0+IP:GOSUB 37900

37300 E=E+Z

37400 NEXT N

37500 E=E/(4*(KM+1)):'   CALCULATE AVERAGE DIFFERENCE BETWEEN
```

CALCULATED ELLIPSE AND IMAGE OF INDICIA

37700 IF E>.1 THEN L=0 ELSE L=1:' IF DIFFERENCE LESS THAN TEN PERCENT, THE INDICIA IS CONSIDERED AN ELLIPSE

37800 RETURN

37900 'CALCULATE DIFFERENCE BETWEEN IMAGE INDICIA AND TEMPLATE POINT SUBROUTINE

37950 QN=ABS(K-L)

38000 FOR Q=K TO L

38010 IF PPOINT(X,Q)=0 THEN 38030

38020 NEXT Q

38030 QK=ABS(Y-Q)

38040 IF QK<QN THEN QN=QK

38050 FOR Q=L TO K STEP −1

38060 IF PPOINT(X,Q)=0 THEN 38080

38070 NEXT Q

38080 QK=ABS(Y-Q)

38090 IF QK<QN THEN QN=QK

38300 Z=ABS((QN*2)/(K-L))

38500 RETURN

38600 'TRIANGLE TEST

38700 N=0:A=C(M,1)+1:B=C(M,2)+1:C=C(M,3)−1:D=C(M,4)−1

38800 I=A:Q=0:R=0

38900 FOR J=B TO D

39000 GOSUB 43400:' FIND APEXES OF TRIANGLE

39100 IF L<>0 THEN 41300

39200 NEXT J

39300 N=N+Q

39400 J=D:Q=0:R=0

39500 FOR I=A TO C

39600 GOSUB 43400

39700 IF L<>0 THEN 41300

39800 NEXT I

39900 N=N+Q

40000 I=C:Q=0:R=0

```
40100 FOR J=D TO B STEP -1

40200 GOSUB 43400

40300 IF L<>0 THEN 41300

40400 NEXT J

40500 N=N+Q

40600 J=B:Q=0:R=0

40700 FOR I=C TO A STEP -1

40800 GOSUB 43400

40900 IF L<>0 THEN 41300

41000 NEXT I

41100 N=N+Q

41200 P(0,0)=N:GOTO 41400

41300 L=0:RETURN

41400 GOSUB 41900:'      DELETE SHORT SIDES

41500 IF N<>3 THEN 41700

41600 L=1:RETURN

41700 GOTO 41800

41800 L=0:RETURN

41900 ' DELETE SHORT SIDES CAUSED BY ROUNDED APEXES FROM CAMERA

42000 N=P(0,0):'         GET NUMBER OF APEXES ON INDICIA

42100 IF N<3 THEN 43300:' TEST IF INDICIA CONTAINS THREE APEXES

42200 P(N+1,0)=P(1,0):P(N+1,1)=P(1,1):' DELETE SHORT SIDE

42300 FOR X=1 TO N

42400 A=P(X,0):B=P(X,1):C=P(X+1,0):D=P(X+1,1)

42500 R=SQR(((A-C)*(A-C))+((B-D)*(B-D))):' CALCULATE LENGTH OF SIDES

42600 IF R>10 THEN 43200

42700 FOR I=X+1 TO N

42800 P(I,0)=P(I+1,0):P(I,1)=P(I+1,1):' DELETE SHORT SIDE

42900 NEXT I

43000 P(0,0)=P(0,0)-1

43100 GOTO 42000

43200 NEXT X

43300 RETURN

43400 'APEX SCAN SUBROUTINE

43500 K=PPOINT(J,I):'    SCAN AROUND PERIMETER OF INDICIA FOR APEX
```

```
43600 IF K<>0 THEN 44500
43700 IF N=0 THEN 43900
43800 IF I=P(N,0) AND J=P(N,1) THEN 44300
43900 IF N<8 THEN 44100
44000 L=1:RETURN
44100 IF Q=1 OR R=1 THEN 44400
44200 N=N+1:P(N,0)=I:P(N,1)=J:R=1:GOTO 44500
44300 R=1:GOTO 44500
44400 P(N+1,0)=I:P(N+1,1)=J:Q=1
44500 L=0:RETURN
44600 'CALCULATE DISTANCE OF ELLIPSE INDICIA FROM CAMERA SUBROUTINE
44700 IF PR=0 THEN 44900 ELSE 45100
44800 'CALCULATE DISTANCE FROM CAMERA OF CIRCULAR INDICIA
44900 IF C(LL,11)=0 THEN C(LL,22)=999 ELSE C(LL,22)=DK/C(LL,11)
45000 GOTO 45300:' DISTANCE IS INVERSELY PROPORTIONAL TO MAJOR-AXIS
45100 'CALCULATE DISTANCE OF PROJECTED CIRCULAR INDICIA
45200 IF C(LL,12)=0 THEN C(LL,22)=999 ELSE C(LL,22)=DK/C(LL,12):'DISTANCE
IS INVERSELY PROPORTIONAL TO MINOR-AXIS FOR PROJECTED INDICIA
45300 RETURN
45400 'DETERMINE ORIENTATION OF CIRCULAR INDICIA
45500 X=C(LL,8)-C(LL,6):'      CALCULATE SLOPE OF MAXIMUM AXIS
45600 IF ABS(X)>.001 THEN S=(C(LL,5)-C(LL,7))/X ELSE S=64000
45700 A=ATN(ABS(S)):' CALCULATE ANGLE OF MAXIMUM AXIS AS ARC TANGENT
OF THE SLOPE OF THE MAXIMUM AXIS
45800 IF S<0 THEN A=PI-A:' IF SLOPE IS NEGATIVE, SET ANGLE BETWEEN
90 AND 180 DEGREES
45900 C=A*180/PI:C(LL,23)=C:' CONVERT ANGLE FROM RADIANS TO DEGREES
46000 T=C(LL,12)/C(LL,11):'  CALCULATE RATIO OF MINIMUM AXIS DIVIDED
BY MAXIMUM AXIS GIVING ECCENTRICITY OF THE ELLIPSE
46100 B=-ATN(T/SQR(-T*T+1))+1.5708:' CALCULATE ARC COSINE OF RATIO
46200 D=B*180/PI:C(LL,24)=D:' CONVERT ANGLE FROM RADIANS TO DEGREES
46210 GOSUB 63300
46300 RETURN
46400 'DETERMINE ORIENTATION ANGLES OF TRIANGLE INDICIA SUBROUTINE
```

```
46500 ' GET COORDINATES OF TRIANGLE INDICIA APEXES OF TRIANGLE

46550 M=LL:GOSUB 38600:'      SCAN FOR APEXES (VERTEXES) OF TRIANGLE

46600 X1=P(1,1):Y1=P(1,0):'   GET COORDINATE OF FIRST APEX (VERTEX)

46700 X2=P(2,1):Y2=P(2,0):'   GET COORDINATE OF SECOND APEX

46800 X3=P(3,1):Y3=P(3,0):'   GET COORDINATE OF THIRD APEX

46900 'CALCULATE MID-POINTS OF SIDES OF TRIANGLE

47000 XB=(X2+X3)/2:YB=(Y2+Y3)/2

47100 XC=(X3+X1)/2:YC=(Y3+Y1)/2

47200 'CALCULATE CENTROID OF TRIANGLE FROM THE INTERSECTION OF
TWO LINES CONNECTING TWO APEXES TO TWO MID-POINTS OF TRIANGLE

47300 M1=(Y1-YB)/(X1-XB):'    CALCULATE SLOPE OF FIRST LINE

47400 M2=(Y2-YC)/(X2-XC):'    CALCULATE SLOPE OF SECOND LINE

47500 B1=Y1-M1*X1:'           CALCULATE EQUATION OF FIRST LINE

47600 B2=Y2-M2*X2:'           CALCULATE EQUATION OF SECOND LINE
47700 ' CALCULATE CENTROID OF TRIANGLE INDICIA IMAGE

47800 XC=(B2-B1)/(M1-M2):'    CALCULATE X COORDINATE OF CENTROID

47900 YC=(M1*XC)+B1:'         CALCULATE Y COORDINATE OF CENTROID

48000 GOSUB 48200:'           CIRCUMSCRIBE ELLIPSE AROUND TRIANGLE

48100 RETURN

48200 'CIRCUMSCRIBE ELLIPSE AROUND THREE APEXES OR CORNERS OF
POLYGON SUBROUTINE'

48300 X1=X1-XC:Y1=YC-Y1:' TRANSLATE ORIGIN OF COORDINATE AXES TO
CENTROID OF TRIANGLE

48400 X2=X2-XC:Y2=YC-Y2

48500 X3=X3-XC:Y3=YC-Y3

48600 'CIRCUMSCRIBE POLYGON WITH ELLIPSE WHICH IS CENTERED AT
CENTROID, AND WITH THE ELLIPSE LYING ON THREE APEXES OF
TRIANGLE OR LYING ON ANY THREE CORNERS OF POLYGON

48700 'SOLVE FOR THE COEFFICIENTS A, B, AND C OF THE EQUATION OF
AN ELLIPSE (AXX + BXY + CYY - 1 = 0) USING THREE SIMULTANEOUS
EQUATIONS OF THE ELLIPSE AT THE THREE APEX POINTS OF THE POLYGON

48800 A1=X1*X1:B1=X1*Y1:C1=Y1*Y1:'   EQUATION ONE

48900 A2=X2*X2:B2=X2*Y2:C2=Y2*Y2:'   EQUATION TWO

49000 A3=X3*X3:B3=X3*Y3:C3=Y3*Y3:'   EQUATION THREE
```

49100 'DETERMINE A, B, AND C BY SOLVING FOR THEM FROM THE THREE EQUATIONS USING METHOD OF SUBSTITUTION

49200 H=(1-C3/C1)*(B2-(B1*C2)/C1)

49300 H=H+(((B1*C3)/C1)-B3)*(1-C2/C1)

49400 H=H+(((C2*B3)/C1)-B3)

49500 G=(A3-((A1*C3)/C1))*(B2-((B1*C2)/C1))

49600 G=G-((((B1*C3)/C1)-B3)*(((A1*C2)/C1)-A2))

49700 G=G-((B3*A2)-((A1*C2*B3)/C1))

49800 A=H/G

49900 B=(1-C2/C1)+((((A1*C2)/C1)-A2)*A)

50000 B=B/(B2-((B1*C2)/C1))

50100 C=(1/C1)-((A1*A)/C1)-((B1*B)/C1)

50200 GOSUB 50400:'      DRAW CIRCUMSCRIBING ELLIPSE ON COMPUTER DISPLAY

50210 GOSUB 44600:'      CALCULATE DISTANCE OF INDICIA FROM CAMERA

50220 GOSUB 45400:'      CALCULATE ORIENTATION OF INDICIA

50230 GOSUB 63000:'      CALCULATE ROTATIONAL ORIENTATION OF INDICIA

50300 RETURN

50400 'DRAW CIRCUMSCRIBING ELLIPSE ON COMPUTER DISPLAY

50500 AA=0:BB=255

50600 FOR X=-255 TO 255

50700 R=(B*X*B*X)-(4*C*(A*X*X-1)):'   FOR EVERY X VALUE, SOLVE FOR Y'S

50800 IF R<0 THEN 52100

50900 Y1=((-B*X)+SQR(R))/(2*C):'      FOR GIVEN X, CALCULATE TWO Y VALUES

51000 Y2=((-B*X)-SQR(R))/(2*C):'      WHICH ARE ON THE ELLIPSE

51100 GOSUB 52800:'      FIND MAX & MIN AXES OF CIRCUMSCRIBING ELLIPSE

51110 C(LL,11)=AA:C(LL,12)=BB:'  SAVE MAX & MIN AXES  LENGTHS

51120 C(LL,7)=AY:C(LL,8)=AX:C(LL,9)=BY:C(LL,10)=BX:'  SAVE MAX & MIN AXES POINTS ON THE ELLIPSE

51130 C(LL,5)=YC:C(LL,6)=XC:'  SAVE CENTROID

51200 Y1=INT(Y1):Y2=INT(Y2)

51300 S=INT((XC+X)/1)

51400 T=INT((YC-Y1)/1)

51500 IF S<0 OR S>255 THEN 52100

```
51600 IF T<0 OR T>191 THEN 52100

51700 PSET(S,T,0):'          DISPLAY POINT ON COMPUTER DISPLAY

51800 T=INT((YC-Y2)/1)

51900 IF T<0 OR T>191 THEN 52100

52000 PSET(S,T,0)

52100 NEXT X

52200 RETURN

52300 'CALCULATE ORIENTATION ANGLES OF CIRCUMSCRIBING ELLIPSE

52400 CB=ABS(BB/AA):'  RATIO OF MINOR AXIS DIVIDED BY MAJOR AXIS

52500 CB=-ATN(CB/SQR(-CB*CB+1))+1.5708:'  ARC COSINE OF CB

52600 CB=CB*180/PI

52700 RETURN

52800 'DETERMINE MAXIMUM AND MINIMUM AXES OF CIRCUMSCRIBING ELLIPSE

52900 U=SQR(X*X+Y1*Y1)

53000 V=SQR(X*X+Y2*Y2)

53100 IF U<AA THEN 53300

53200 AA=U:AX=X:AY=Y1

53300 IF V<AA THEN 53500

53400 AA=V:AX=X:AY=Y2

53500 IF V>BB THEN 53700

53600 BB=U:BX=X:BY=Y1

53700 IF V>BB THEN 53900

53800 BB=V:BX=X:BY=Y2

53900 RETURN

54000 'DETERMINE ORIENTATION OF A SQUARE, RECTANGLE, OR BAR CODE
SUBROUTINE

54050 M=LL:GOSUB 38600:'       FIND CORNERS OF INDICIA

54100 X1=P(1,1):Y1=P(1,0):'    GET COORDINATES OF CORNERS

54200 X2=P(2,1):Y2=P(2,0)

54300 X3=P(3,1):Y3=P(3,0)

54400 X4=P(4,1):Y4=P(4,0)

54500 'CALCULATE CENTROID OF SQUARE OR RECTANGLE FROM THE
INTERSECTION OF THE TWO DIAGONALS
```

```
54600 M1=(Y1-Y3)/(X1-X3):'        CALCULATE SLOPE OF FIRST DIAGONAL

54700 M2=(Y2-Y4)/(X2-X4):'        CALCULATE SLOPE OF SECOND DIAGONAL

54800 B1=Y1-M1*X1:'               CALCULATE EQUATION OF FIRST DIAGONAL

54900 B2=Y2-M2*X2:'               CALCULATE EQUATION OF SECOND DIAGONAL

55000 ' CALCULATE CENTROID OF SQUARE, RECTANGLE, OR BAR CODE

55100 XC=(B2-B1)/(M1-M2)

55200 YC=(M1*XC)+B1

55300 GOSUB 48200:'               CIRCUMSCRIBE INDICIA WITH ELLIPSE, AND
DETERMINE ORIENTATION ANGLES

55400 RETURN

55500 IF CZ<>0 THEN 55600:'STORE CODED INSTRUCTIONS SUBROUTINE

55510 DIM CC(9)

55520 CZ=1

55600 IF C(0,1)<3 THEN 56000

55700 FOR M=1 TO C(0,1)-2

55800 IF C(0,M+1)=7 THEN 56100:' "PROGRAM"

55900 NEXT M

56000 RETURN

56100 FOR N=M TO C(0,1)-1

56200 IF C(0,N+1)=11 THEN 56500:' "INSTRUCTION"

56300 NEXT N

56400 GOTO 56000

56500 K=C(0,N+2)

56600 IF K=5 THEN 57400:' STORE START INSTRUCTION

56700 IF K=6 THEN 57600:' STORE PICKUP INSTRUCTION

56800 IF K=8 THEN 57600:' STORE PLACE-IN INSTRUCTION

56900 IF K=3 THEN 57100:'STORE END INSTRUCTION

57000 GOTO 56000

57100 SI=0:TK=1:' RESET START INDICATOR, AND RESET INSTRUCTION
POINTER TO ONE

57200 CC(0)=CC(0)+1:' ADD ONE TO NUMBER OF INSTRUCTIONS

57300 CC(CC(0))=K:GOTO 56000:' STORE INSTRUCTION IN TABLE

57400 SI=1:' PROCESS START INSTRUCTION
```

```
57500  CC(0)=1:CC(1)=5:TK=0:GOTO 56000:' STORE START INSTRUCTION

57600  CC(0)=CC(0)+1:CC(CC(0))=K:' STORE INSTRUCTION IN TABLE

57700  CC(0)=CC(0)+1:CC(CC(0))=C(0,N+3):' STORE IDENTIFICATION CODE
OF PART

57710  GOTO 56000

57800  ' OUTPUT CONTROL SIGNALS TO ROBOT SUBROUTINE

57900  IF TK=0 THEN 58800:' IF INSTRUCTION POINTER IS 0 THEN RETURN

58000  IF CC(0)=0 THEN 58800:' IF NO INSTRUCTION THEN RETURN

58100  IF TK>CC(0) THEN 58800:' IF INSTRUCTION POINTER PASSES END OF
INSTRUCTION LIST THEN RETURN

58200  IF CC(TK)=5 THEN 58300 ELSE 58500:' TEST FOR START INSTRUCTION

58300  TK=TK+1:' POINT TO NEXT INSTRUCTION AFTER START

58400  GOTO 57800

58500  IF CC(TK)=3 THEN 58800:' RETURN IF END INSTRUCTION

58600  IF CC(TK)=6 THEN 58900:' PROCESS PICK-UP INSTRUCTION

58700  IF CC(TK)=8 THEN 59700:' PROCESS PLACE-IN INSTRUCTION

58800  RETURN

58900  TD=CC(TK+1):' GET IDENTIFICATION CODE OF PART

59000  GOSUB 63500:' OPEN ROBOT GRIPPER

59100  JJ=0

59200  GOSUB 62000:' POSITION ROBOT ARM

59300  IF JJ=0 THEN 58800:' RETURN IF POSITIONING OF ROBOT ARM NOT
COMPLETE

59400  GOSUB 63700:' CLOSE ROBOT GRIPPER

59500  TK=TK+2:' SET INSTRUCTION POINTER TO NEXT INSTRUCTION

59600  GOTO 58800

59700  TD=CC(TK+1):' GET IDENTIFICATION CODE OF RECEIVING PART

59800  JJ=0

59900  GOSUB 62000:' POSITION ROBOT ARM

60000  IF JJ=0 THEN 58800:' IF POSITIONING OF ROBOT ARM NOT COMPLETED
THEN RETURN

60100  GOSUB 63500:' OPEN ROBOT GRIPPER

60200  GOTO 59500
```

```
62000  POSITION ROBOT ARM SUBROUTINE

62010  PT=CC(TK+1):' GET PART IDENTIFICATION NUMBER

62020  FOR I=1 TO F

62030  IF PT=C(I,27) THEN 62060

62040  NEXT I

62050  RETURN

62060  PT=I:' GET TABLE OFFSET TO PART IDENTIFICATION CODED INDICIA

62070  FOR J=1 TO F

62080  IF C(J,27)=2 THEN 62110

62090  NEXT J

62100  GOTO 62050

62110  AM=J:' GET TABLE OFFSET TO ROBOT ARM IDENTIFICATION CODED
INDICIA

62220  IF AM=PT THEN 62050

62230  X1=C(PT,6):Y1=C(PT,5):D=999:J=PT:E=999:L=0:GOSUB 62240:GOTO 62320

62240  FOR I=1 TO F:' FIND ORIENTATION CODED INDICIA NEAREST TO
IDENTIFICATION CODED INDICIA  SUBROUTINE

62250  IF C(I,15) <4000 AND C(I,15)> 2999 THEN 62280

62252  IF C(I,15)> 2999 OR C(I,15) <2000 THEN 62260

62253  X3=C(I,6):Y3=C(I,5):KK=SQR((X1-X3)↑2+(Y1-Y3)↑2)

62254  IF KK> E THEN 62260

62255  E=KK:C(J,26)=I

62260  NEXT I

62270  RETURN

62280  X2=C(I,6):Y2=C(I,5):K=SQR((X1-X2)↑2+(Y1-Y2)↑2)

62290  IF K > D THEN 62252

62300  D=K:L=I

62310  GOTO 62252

62320  IF L=0 THEN 62050

62330  PT=L:' GET TABLE OFFSET TO PART ORIENTATION CODED INDICIA

62340  X1=C(AM,6):Y1=C(AM,5):D=999:L=0:J=AM:E=999:GOSUB 62240

62350  IF L=0 THEN 62050

62360  AM=L:' GET TABLE OFFSET TO ROBOT ARM ORIENTATION CODED INDICIA
```

```
62370 IF PT=AM THEN 62050

62380 K=C(AM,26):' CALCULATE GRIPPING POINT OF ARM

62400 XD=X1-X2:YD=Y1-Y2

62410 X1=X1-XD

62420 Y1=Y1-YD

62430 I=C(AM,22):J=C(PT,22):I1=&HDC:I3=&H05:K=100

62440 IF I=J THEN 62480

62450 IF I > J THEN 62470

62460 I2=&H30:GOSUB 62600:GOTO 62480:' SET ROBOT ARM EXTEND COMMAND

62470 I2=&H34:GOSUB 62600:' SET ROBOT ARM RETRACT COMMAND

62480 I=Y1:J=C(PT,5)

62490 IF I=J THEN 62530

62500 IF I < J THEN 62520

62510 I2=&H50:GOSUB 62600:GOTO 62530:' SET ARM PIVOT UP COMMAND

62520 I2=&H54:GOSUB 62600:' SET ARM PIVOT DOWN COMMAND

62530 I=X1:J=C(PT,6)

62540 IF I=J THEN 62580

62550 IF I > J THEN 62570

62560 I2=&HD0:GOSUB 62600:GOTO 62580:' SET ROTATE ARM RIGHT COMMAND

62570 I2=&HD4:GOSUB 62600:' SET ROTATE ARM LEFT COMMAND

62580 GOTO 62700

62600 POKE &H7E50,0:' SEND ROBOT ARM POSITIONING SIGNALS TO ROBOT
CONTROLLER SUBROUTINE

62610 POKE &H7E51,I2

62620 POKE &H7E52,I3

62630 POKE &H7E50,I1

62640 FOR L=1 TO K:NEXT L:' WAIT FOR ROBOT CONTROLLER TO ACCEPT
COMMAND

62650 RETURN

62700 I=C(AM,25):J=C(PT,25)

62710 IF I=J THEN 62750

62720 IF I > J THEN 62740

62730 I2=&H74:GOSUB 62600:GOTO 62750:' SET WRIST ROTATE LEFT COMMAND
```

```
62740  I2=&H70:GOSUB 62600:' SET WRIST ROTATE RIGHT COMMAND

62750  I=C(AM,24):J=C(PT,24)

62760  IF I=J THEN 62800

62770  IF I > J THEN 62790

62780  I2=&H90:GOSUB 62600:GOTO 62800:' SET WRIST PIVOT DOWN COMMAND

62790  I2=&H94:GOSUB 62600:' SET WRIST PIVOT UP COMMAND

62800  I=C(AM,23):J=C(PT,23)

62810  IF I=J THEN 62850

62820  IF I > J THEN 62840

62830  I2=&HF0:GOSUB 62600:GOTO 62850:' SET WRIST YAW RIGHT COMMAND

62840  I2=&HF4:GOSUB 62600:' SET WRIST YAW LEFT COMMAND

62850  RETURN

63000  'DETERMINE ROTATIONAL ORIENTATION OF INDICIA SUBROUTINE

63010  DD=255*255:XX=0:YY=0

63020  FOR I=1 TO F

63030  IF I=LL THEN 63100:' FIND PAIRS OF CIRCULAR AND TRIANGULAR INDICIA

63040  IF C(I,16) < ME THEN 63100

63050  IF INT(C(I,15)/1000) < > 2 THEN 63100

63060  X=C(I,6):Y=C(I,5)

63070  D=(XC-X)↑2+(YC-Y)↑2:' CALCULATE DISTANCE BETWEEN CIRCULAR AND TRIANGULAR INDICIA

63080  IF D > DD THEN 63100

63090  DD=D:XX=X:YY=Y:IR=I

63100  NEXT I

63110  J=0

63120  IF XX < > 0 OR YY < > 0 THEN 63130 ELSE 63200

63130  I=XC-XX:C(LL,26)=IR:' SAVE POINTER TO NEAREST CIRCLE

63140  IF ABS(I) > .001 THEN 63170

63150  IF YC < YY THEN J=90 ELSE J=-90

63160  GOTO 63200

63170  I=(YC-YY)/I:J=ABS(I)

63180  J=ATN(J)*180/PI:' CALCULATE ROTATIONAL ANGLE

63190  IF I < 0 THEN J=-J
```

63200 C(LL,25)=J:' SAVE ROTATIONAL ANGLE

63210 RETURN

63300 ' DETERMINE IF ELLIPSE IS TILTED FORWARDS OR BACKWARDS SUBROUTINE

63310 XC=C(LL,6):YC=C(LL,5)

63320 XX=C(LL,8):YX=C(LL,7)

63330 XN=C(LL,10):YN=C(LL,9)

63340 XX=XX-XC:YX=YC-YX

63350 XN=XN-XC:YN=YC-YN

63360 CT=((XX*XN)+(YX*YN))/(SQR(XX*XX+YX*YX)*SQR(XN*XN+YN*YN)):' CALCULATE ANGLE OF UNIT VECTOR

63370 BETA=C(LL,24)

63380 IF YN < > 0 THEN 63410

63390 IF C(LL,8) < XC THEN C(LL,24)=-BETA ELSE C(LL,24)=BETA

63400 GOTO 63450

63410 IF YN < 0 THEN 63440

63420 IF CT < 0 THEN C(LL,24)=-BETA ELSE C(LL,24)=BETA

63430 GOTO 63450

63440 IF CT > 0 THEN C(LL,24)=-BETA ELSE C(LL,24)=BETA

63450 RETURN

63500 ' OPEN ROBOT GRIPPER SUBROUTINE

63510 POKE &H7E50,0:' SEND RESET SIGNAL TO ROBOT

63520 POKE &H7E51,&HB8:' SEND OPEN ROBOT GRIPPER COMMAND OPCODE AND OPERAND TO ROBOT

63530 POKE &H7E52,&H75

63540 POKE &H7E50,&HCC

63550 RETURN

63700 ' CLOSE ROBOT GRIPPER SUBROUTINE

63710 POKE &H7E50,0:' SEND RESET SIGNAL TO ROBOT CONTROLLER

63720 POKE &H7E51,&HA8:' SEND CLOSE GRIPPER OPCODE AND OPERAND TO ROBOT

63730 POKE &H7E52,0

63740 POKE &H7E50,&HC3

63750 RETURN

```
                 00100 * USR1 CAMERA IMAGE SCAN ASSEMBLY SUBROUTINE
7E70             00110      ORG    $7E70
7E70 20 02       00120      BRA    A1         BRANCH TO A1
7E72    0000     00130 K    FDB    0          IMAGE BYTE ADDRESS
7E74 C6 01       00140 A1   LDB    #1         ADDRESS INCREMENT VALUE
7E76 BE 7E72     00150      LDX    K          LOAD IMAGE BYTE ADDRESS
7E79 A6 84       00160 A2   LDA    ,X         LOAD IMAGE BYTE
7E7B 81 00       00170      CMPA   #0         TEST FOR ZERO IMAGE BYTE
7E7D 26 06       00180      BNE    A9         BRANCH IF NOT ZERO
7E7F 3A          00190      ABX               ADD ONE TO IMAGE BYTE ADDRESS
7E80 8C 1E00     00200      CMPX   #$1E00     TEST FOR LAST IMAGE BYTE
7E83 25 F4       00210      BLO    A2         LOOP TO NEXT IMAGE BYTE
7E85 BF 7E72     00220 A9   STX    K          STORE NON-ZERO IMAGE BYTE ADDRESS
7E88 39          00230      RTS               RETURN
        0000     00240      END
                 00100 * USR0 DIGITAL CAMERA DRIVER SUBROUTINE
                 00110 *
A000             00120 KEYBD  EQU  $A000
7FD2             00130 SETFL  EQU  $7FD2
FF40             00140 STATUS EQU  $FF40
FF41             00150 DATA   EQU  $FF41
0600             00160 GPG1   EQU  $0600
                 00170 *
7FF7             00180 REFRSH EQU  $7FF7
7FF8             00190 EXTRA  EQU  $7FF8
7FF9             00200 LH     EQU  $7FF9
7FFA             00210 EXPOS  EQU  $7FFA
7FFC             00220 LADDR  EQU  $7FFC
7FFE             00230 CMND   EQU  $7FFE
7FFF             00240 RTNCOD EQU  $7FFF
                 00250 *
7FF0             00260 CNT    EQU  $7FF0
7FF1             00270 SAVDP  EQU  $7FF1
                 00280 *
                 00290 *
                 00300 *
7F00             00310      ORG    $7F00
7F00 86 7F       00320 DOIT  LDA   #$7F       SET DP REGISTER
7F02 1E 8B       00330      EXG    A,DP       TO $7F AND SAVE
     7F          00340      SETDP  $7F        OLD DP REGISTER
7F04 97 F1       00350      STA    SAVDP
7F06 86 C0       00360 RESET LDA   #$C0
7F08 B7 FF40     00370      STA    STATUS     INIT
7F0B 86 28       00380      LDA    #$28
7F0D B7 FF40     00390      STA    STATUS
7F10 AD 9F 7FD2  00400 NEWPIC JSR  [SETFL]
7F14 27 10       00410      BEQ    NEW2       KEY?
7F16 97 FF       00420      STA    RTNCOD     ..YES
7F18 96 FE       00430      LDA    CMND
7F1A 84 FC       00440      ANDA   #$FC       REFRESH
7F1C 8A 01       00450      ORA    #1         NOSEND
7F1E BD 7FA7     00460      JSR    SCMND
7F21 96 F1       00470      LDA    SAVDP      RESTORE
7F23 1F 8B       00480      TFR    A,DP       DP REG.
7F25 39          00490      RTS               RETURN
                 00500 *
7F26 96 FE       00510 NEW2  LDA   CMND
7F28 8A 03       00520      ORA    #3         SOAK & NOSEND
7F2A BD 7FA7     00530      JSR    SCMND
7F2D 17 0090     00540      LBSR   SOAK       WAIT SOME TIME
7F30 8E 0600     00550      LDX    #GPG1      START OF SCREEN
7F33 96 FE       00560      LDA    CMND
7F35 8A 02       00570      ORA    #2         SOAK
7F37 D6 F7       00580      LDB    REFRSH
7F39 27 02       00590      BEQ    NEW3
7F3B 84 FD       00600      ANDA   #$FD       REFRESH
```

```
7F3D 84   FE       00610 NEW3    ANDA  #$FE     SEND
7F3F 8D   66       00620         BSR   SCMND
                   00630 *
7F41 96   F9       00640         LDA   LH       LEFT HALF ONLY?
7F43 27   36       00650         BEQ   QLOOP    QUICK LOOP
7F45 108E 0020     00660 TLOOP   LDY   #32
7F49 5F            00670         CLRB           CLR TOGGLE
7F4A 0F   F0       00680 NXTBYT  CLR   CNT
7F4C B6   FF40     00690 NXT2    LDA   STATUS
7F4F 2B   06       00700         BMI   NXT3     GOT IT
7F51 0A   F0       00710         DEC   CNT
7F53 26   F7       00720         BNE   NXT2
7F55 27   B9       00730         BEQ   NEWPIC
7F57 B6   FF41     00740 NXT3    LDA   DATA
7F5A C1   00       00750         CMPB  #0       TOG SET?
7F5C 26   02       00760         BNE   NOSTOR   ..YES
7F5E A7   80       00770         STA   ,X+
7F60 96   F9       00780 NOSTOR  LDA   LH       LEFT ONLY?
7F62 27   11       00790         BEQ   NOTOG
7F64 31   3F       00800         LEAY  -1,Y     DECR 32
7F66 26   0D       00810         BNE   NOTOG
7F68 C1   00       00820         CMPB  #0
7F6A 26   04       00830         BNE   CLRTOG
7F6C C6   01       00840 SETTOG  LDB   #1
7F6E 20   01       00850         BRA   P8C
7F70 5F            00860 CLRTOG  CLRB
7F71 108E 0020     00870 P8C     LDY   #32 RESET CNTR
7F75 9C   FC       00880 NOTOG   CMPX  LADDR DONE ?
7F77 25   D1       00890         BLO   NXTBYT
7F79 20   14       00900         BRA   LEFTOV
                   00910 *
7F7B 5F            00920 QLOOP   CLRB
7F7C B6   FF40     00930 QL2     LDA   STATUS
7F7F 2B   05       00940         BMI   QL3
7F81 5A            00950         DECB
7F82 26   F8       00960         BNE   QL2
7F84 27   8A       00970         BEQ   NEWPIC
7F86 B6   FF41     00980 QL3     LDA   DATA
7F89 A7   80       00990         STA   ,X+
7F8B 9C   FC       01000         CMPX  LADDR
7F8D 25   EC       01010         BLO   QLOOP
                   01020 *
7F8F 96   F8       01030 LEFTOV  LDA   EXTRA
7F91 1027 FF7B     01040         LBEQ  NEWPIC
7F95 0F   F0       01050         CLR   CNT
7F97 0A   F0       01060 LEFT2   DEC   CNT
7F99 1027 FF73     01070         LBEQ  NEWPIC
7F9D B6   FF40     01080         LDA   STATUS
7FA0 2A   F5       01090         BPL   LEFT2
7FA2 B6   FF41     01100         LDA   DATA
7FA5 20   E8       01110         BRA   LEFTOV
                   01120 *
7FA7 34   15       01130 SCMND   PSHS  CC,X,B
7FA9 8E   0008     01140         LDX   #8
7FAC 1F   89       01150         TFR   A,B
7FAE 56            01160 S2      RORB
7FAF 49            01170         ROLA
7FB0 30   1F       01180         LEAX  -1,X
7FB2 26   FA       01190         BNE   S2
7FB4 F6   FF40     01200 S3      LDB   STATUS
7FB7 C4   40       01210         ANDB  #$40
7FB9 27   F9       01220         BEQ   S3
7FBB B7   FF41     01230         STA   DATA
7FBE 35   95       01240         PULS  PC,CC,X,B
                   01250 *
7FC0 34   15       01260 SOAK    PSHS  B,CC,X
```

```
7FC2 9E  FA        01270            LDX   EXPOS
7FC4 27  09        01280            BEQ   SOAK4
7FC6 C6  AA        01290  SOAK2     LDB   #170
7FC8 5A            01300  SOAK3     DECB
7FC9 26  FD        01310            BNE   SOAK3
7FCB 30  1F        01320            LEAX  -1,X
7FCD 26  F7        01330            BNE   SOAK2
7FCF 35  95        01340  SOAK4     PULS  PC,B,CC,X
                   01350  *
7FD1 12            01360  Z         NOP
7FD2     7FD4      01370  SETFL     FDB   SETFLG
7FD4 B6  7FE1      01390  SETFLG    LDA   FLAG
7FD7 26  07        01400            BNE   SETF2
7FD9 86  01        01410            LDA   #1
7FDB B7  7FE1      01420            STA   FLAG
7FDE 86  00        01430            LDA   #0
7FE0 39            01440  SETF2     RTS
7FE1     00        01450  FLAG      FCB   0
         0000      01460            END
```

What is claimed is:

1. An orientation and control system for robots comprising:
a random oriented part having coded indicia being digital image processor recognizable; a camera being positioned so as to view the coded indicia, a digital image processor interconnected to said camera for recognizing the indicia image and further comprising a computer for decoding the indicia so as to provide an x y z axes orientation input signal; a robot having an arm for performing an operation with said part, said robot arm having coded indicia operatively associated therewith, said robot indicia being viewable by said camera and said robot indicia being processable by said processor and computer for comparison of said robot indicia with said part indicia, and means to actuate said arm, said processor and computer providing said input signal to said actuating means for controlling the robot arm in performing the operation on said part.

2. The system of claim 1, said part indicia comprising part identification indicia and part orientation indicia, and said robot arm indicia comprising operating instructions for using said part by said robot arm.

3. The system of claim 2, said part being formed and sid robot arm being cooperatively adaptable to engage said part.

4. The system of claim 3, said robot arm and part indicia being in continuous view, and said computer input to said actuator being continuous, so that there is a docking action of the part with the robot arm.

5. The system of claim 4, further comprising conveyor means for moving said part to said robot arm.

6. The part of claim 2, said identification indicia comprising a plurality of colors.

7. The part of claim 6, said symbols comprising geometric shapes.

8. The part of claim 2, said orientation indicia being of a geometric shape.

9. The part of claim 2, said indicia being disposed on a plurality of sides of said part.

10. The system of claim 2, said part comprising operating instruction indicia.

11. The part of claim 1, each of said indicia comprising geometric shapes.

12. The part of claim 11, said indicia comprising a plurality of differently colored symbols, whereby the juxtaposition of the symbol is coded for a specific part.

13. The part of claim 1, further comprising a label on said part, said label being adhesively removable from said part, said label bearing said indicia.

14. The part of claim 1, said indicia comprising geometric shapes and a plurality of colors.

15. The system of claim 1, further comprising an indicia application station spacedly disposed from said robot arm, and means to apply said indicia to said part or robot arm.

16. The system of claim 15, said indicia application station further comprising label applying means and a plurality of labels applied to said part at said station, said indicia appearing on one side of the label, and adhesive means on the other side of the label, for application to said part.

17. The system of claim 15, said indicia application means comprising a projector with means to focus an image of said indicia on said part so that said camera can view said projected image; said projector including a computer with memory storage means, said memory storage means stores said indicia image so as to provide input to the projector for indicia image projection on the part.

18. The system of claim 15, further comprising conveyor means to convey said part to said robot arm.

19. The system of claim 1, said indicia is formed on said part.

20. An orientation and control system for robots comprising;
a part having coded indicia on said part, said coded indicia being digital image processor recognizable; a camera being positioned so as to view the coded indicia; a digital image processor interconnected to said camera for recognizing the indicia image and further comprising a computer interconnected to said processor for decoding the indicia so as to provide an input signal; a robot having an arm for performing an operation with said part, and means to actuate said arm, said processor and computer providing said input signal to said actuating means for controlling the robot arm in relation to said operation on said part; and indicia application means comprising a projector with means to focus an image of said indicia on said part so that said camera can view said projected image; said projector being interconnected to said computer, so as to provide computer input to the projector for indicia image projection on the part.

21. The system of claim 20, wherein said camera views the projected image at the same time the image is projected by the projector so as to form a closed loop.

22. The system of claim 21, further comprising a plurality of parts, a plurality of cameras and a plurality of projectors, said cameras and projectors being integrated with said computer so as to provide dynamic operations.

23. The system of claim 22, comprising a second part, said first part being disposed and said second part being movable by said robot arm in relation to an operation of said first part.

24. The part of claim 20, said indicia comprising a circle.

25. The part of claim 24, said circle image being an ellipse and said processor including means to determine the distance of the diameters of the ellipse from the camera.

26. A robot assembly system for the assembly of unoriented parts without using parts fixtures and parts positioning equipment, comprising:

a part having random orientation, said part having orientation indicia on said part to provide three dimensional disposition data of said part, and identification indicia on said part;

camera means to form an image of said orientation indicia and to form an image of said identification indicia;

computer means to determine the three dimensional disposition of said orientation indicia from said image of said orientation indicia;

manipulator means to manipulate said part;

means to make identification of said part from said image of identification indicia; and assembly means to assemble said part using said manipulator means without the first use of part positioning mechanisms, whereby the manipulator manipulates said part according to said computer determined disposition without pre-orientation of the part before said part is manipulated.

* * * * *